United States Patent
Masui et al.

(10) Patent No.: US 7,051,825 B2
(45) Date of Patent: May 30, 2006

(54) STRUCTURE FOR INSTALLING HIGH-VOLTAGE EQUIPMENT COMPONENT TO VEHICLE

(75) Inventors: Ritsuo Masui, Wako (JP); Hiroshi Ohtsuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 15 days.

(21) Appl. No.: 10/850,337

(22) Filed: May 20, 2004

(65) Prior Publication Data

US 2004/0235315 A1    Nov. 25, 2004

(30) Foreign Application Priority Data

May 21, 2003    (JP)    ............................. 2003-143414
May 21, 2003    (JP)    ............................. 2003-143415

(51) Int. Cl.
  *B60R 16/04*    (2006.01)
(52) U.S. Cl. ................... 180/68.5; 180/65.1; 180/65.2; 280/727; 280/783; 220/653
(58) Field of Classification Search ............... 180/69.1, 180/68.5, 313, 68.1, 65.1, 65.2; 280/783, 280/727

See application file for complete search history.

(56) References Cited

U.S. PATENT DOCUMENTS

| | | | | |
|---|---|---|---|---|
| 1,782,817 A | * | 11/1930 | Grimm | ................... 296/193.07 |
| 4,216,839 A | | 8/1980 | Gould et al. | |
| 5,390,754 A | | 2/1995 | Masuyama et al. | |
| 5,392,873 A | * | 2/1995 | Masuyama et al. | ........ 180/68.5 |
| 6,188,574 B1 | * | 2/2001 | Anazawa | ..................... 361/695 |
| 6,196,308 B1 | * | 3/2001 | Halligan | ..................... 165/203 |
| 6,230,677 B1 | | 5/2001 | Setsuda | |
| 6,752,304 B1 | * | 6/2004 | Hotary et al. | ............... 224/544 |

FOREIGN PATENT DOCUMENTS

| | | |
|---|---|---|
| DE | 94 10 158 | 10/1994 |
| DE | G 94 10 158.2 | 10/1994 |
| DE | 101 32 191 A1 | 1/2003 |
| FR | 2 684 606 | 6/1993 |
| JP | 7-156826 | 6/1995 |
| JP | 11-178115 | 7/1999 |

OTHER PUBLICATIONS

Edited by A. H. Landrock, Handbook of Plastic Foams, 1995, William Andrew Publishing/Noyes, pp. 1 and 2.*

* cited by examiner

*Primary Examiner*—Christopher P. Ellis
*Assistant Examiner*—John Walters
(74) *Attorney, Agent, or Firm*—Hamre, Schumann, Mueller & Larson, P.C.

(57) ABSTRACT

A high-voltage equipment component is disposed in a recessed accommodating portion which is formed on a vehicle body floor in such a manner as to be recessed downwardly. The high-voltage equipment component is accommodated in the recessed accommodating portion in a suspended state via a sub-assembly frame which is supported on the vehicle body floor. A heat insulating member for forming a flow path for allowing cooling air to flow towards the high-voltage equipment component is interposed between the high-voltage equipment component and a bottom portion of the recessed accommodating portion.

6 Claims, 18 Drawing Sheets

STRUCTURE FOR INSTALLING HIGH-VOLTAGE EQUIPMENT COMPONENT TO VEHICLE

BACKGROUND OF THE INVENTION

1. Field of the Invention

The present invention relates to a structure for installing a high-voltage equipment component to a vehicle.

2. Description of the Related Art

In a hybrid vehicle which runs using an output of an internal combustion engine and an output of an electric motor or an electric vehicle which runs only on the output of electric motor, a large high-voltage equipment component is installed on a vehicle. As a technique relating to a structure for installing a high-voltage equipment component on a vehicle, there have been disclosed structures in which a high-voltage equipment component is mounted an a lower side of a vehicle body floor from below (for example, refer to JP-A-7-156826 and JP-A-11-178115).

However, in the structure in which the high-voltage equipment component is mounted on the lower side of the vehicle body floor from below, mounting and dismounting work must be carried out from below relative to the vehicle body floor, which naturally leads to a problem that the working efficiency of the mounting and dismounting work become inferior. In addition, there is caused another problem; since the high-voltage equipment component is supported on an outer cover member, distortion and deviation are easily caused, which constitutes a cause of a failure of the component.

In addition, since the high-voltage equipment component is placed on the outer cover member, there has existed a problem that the construction of a flow path for passing cooling air to the high-voltage equipment component becomes complicated and hence the construction cost are increased. In addition, since the high-voltage equipment component is placed on the outer cover member, there has existed a problem that in case some force is applied to the outer cover member to deform the same cover member, the effect of the deformation is directly applied to the high-voltage equipment component.

SUMMARY OF THE INVENTION

A first object of the invention is to provide a structure for installing a high-voltage equipment component to a vehicle which can improve the working efficiency of mounting and dismounting the high-voltage equipment component on and from the vehicle body side, and which can increase the reliability of the high-voltage equipment component so mounted by preventing the occurrence of distortion and deviation.

A second object of the invention is to provide a structure for installing a high-voltage equipment component to a vehicle which can improve the working efficiency or mounting and dismounting the high-voltage equipment component on and from the vehicle body side, which can construct a flow path for passing cooling air to the high-voltage equipment component at low costs, and which can protect the high-voltage equipment component even when some force is exerted on the vehicle body floor from therebelow to deform the same floor.

With a view to attaining the objects, according to a first aspect of the invention, there is provided a structure for installing a high-voltage electrical equipment component to a vehicle, wherein the high-voltage electrical equipment component (for example, a high-voltage equipment component 41 in an embodiment of the invention) is arranged in a downwardly recessed accommodating portion (for example, a recessed accommodating portion 20 in the embodiment) formed on a vehicle body floor (for example, a vehicle body floor 10 in the embodiment) in a suspended state.

Thus, since the high-voltage equipment component is arranged in the downwardly recessed accommodating portion formed on the vehicle body floor in the suspended states mounting and dismounting work can be performed from above relative to the vehicle body floor.

According to a second aspect of the invention, there is provided a structure for installing a high-voltage electrical equipment component to a vehicle as set forth in the first aspect of the invention, wherein the high-voltage equipment component is accommodated in the recessed accommodating portion in the suspended state via a sub-assembly frame (for example, a sub-assembly frame in the embodiment) which is supported on the vehicle body floor.

Thus, since the high-voltage equipment component is accommodated in the downwardly recessed accommodating portion on the vehicle body floor in the state in which the high-voltage equipment component is suspended via the sub-assembly which is supported on the vehicle body floor, the mounting and dismounting work can be carried out from above relative to the vehicle body floor. In addition, since the high-voltage equipment component has the sub-assembly frame, the rigidity of the high-voltage equipment component can be increased by the sub-assembly frame. Furthermore, since the high-voltage equipment component is suspended, a gap can be formed between the recessed accommodating portion and the high-voltage equipment component.

According to a third aspect of the invention, there is provided a structure for installing a high-voltage electrical equipment component to a vehicle as set forth in the second aspect of the invention, wherein the sub-assembly frame is connected to a reinforcement member (for example, cross members 26, 28 in the embodiments or the vehicle body floor which is provided on an upper or lower surface of the vehicle body floor.

Thus, since the sub-assembly frame is connected to the reinforcement member of the vehicle body floor, the rigidity of the sub-assembly frame or the rigidity of the high-voltage equipment component can further be increased.

According to a fourth aspect of the invention, there is provided a structure for installing a high-voltage electrical equipment component to a vehicle as set forth in the third aspect of the invention, wherein the sub-assembly frame is connected to a lower portion of a cross member which is provided so as to extend transversely across the recessed accommodating portion.

Thus, since the sub-assembly frame is connected to a lower portion of a cross member which is provided so as to extend transversely across the recessed accommodating portion, the rigidity, in particular, in the transverse direction of the sub-assembly frame can be increased.

According to a fifth aspect of the invention, there is provided a structure for installing a high-voltage electrical equipment component to a vehicle as set forth in any of the second to fourth aspects of the invention, wherein the sub-assembly frame is formed into an annular configuration which follows an interior side of an opening in the accommodating recessed portion.

Thus, since the sub-assembly frame is formed into an annular configuration which follows an interior side of an opening in the accommodating recessed portion and is formed into a closed configuration, the rigidity of the sub-assembly frame or the rigidity of the high-voltage equipment component can further be increased.

According to a sixth aspect of the invention, there is provided a structure for installing a high-voltage electrical equipment component to a vehicle, wherein a heat insulating member (for example, a mat member 40 in the embodiment) for forming a flow path for allowing cooling air to flow towards the high-voltage equipment component is interposed between the high-voltage equipment component and a bottom portion of the recessed accommodating portion.

Thus, since the high-voltage equipment component is arranged in the downwardly recessed accommodating portion formed on the vehicle body floor in the suspended state, mounting and dismounting work can be performed from above relative to the vehicle body floor. In addition, since the heat insulating member is disposed in a gap formed between the high-voltage equipment component and a bottom portion of the recessed accommodating portion due to the high-voltage equipment component being suspended so as to construct a flow path for allowing cooling air to flow to the high-voltage equipment component using the heat insulating member, the flow path can be constructed relatively easily. Furthermore, since the heat insulating member is disposed in the gap formed between the high-voltage equipment component and the bottom portion of the recessed accommodating portion due to the high-voltage equipment component being suspended, even if some force is applied to the vehicle body floor from therebelow to thereby deform the same floor, the deformation can be absorbed by the heat insulating member which is deformed in turn.

According to a seventh aspect of the invention, there is provided a structure for installing a high-voltage electrical equipment component to a vehicle as set forth in the sixth aspect of the invention, wherein the heat insulating member is formed of a resilient material and is pressed to be compressed and deformed by the high-voltage equipment component when the high-voltage equipment component is arranged in the recessed accommodating portion.

Thus, since the heat insulating member is pressed to be compressed and deformed by the high-voltage equipment component when it is arranged in the recessed accommodating portion, the gap formed between the heat insulating member and the high-voltage equipment component in the flow path formed by the heat insulating member can be sealed, whereby any leakage of cooling air from the gap can be prevented. In addition, the mounting error of the high-voltage equipment component can be absorbed by the deformation of the heat insulating member.

According to an eighth aspect of the invention, there is provided a structure for installing a high-voltage electrical equipment component to a vehicle as set forth in the seventh aspect of the invention, wherein the heat insulating member is pressed to be compressed and deformed by a connecting member (for example, a fixing bracket 57 in the embodiment) which connects respective pieces of high-voltage equipment (for example, a battery box 43, a DC-DC converter 47, a junction box 48, and a controller 49) of the high-voltage equipment component together.

Thus, since the heat insulating member is pressed to be compressed and deformed by the connecting member which connect the respective pieces of high-voltage equipment or the high-voltage equipment component together, only the shape of the connecting member may be taken into consideration when it comes to a sealed portion of the heat insulating member which compresses and deforms at the time of constructing the flow path of cooling air.

DETAILED DESCRIPTION OF THE INVENTION

A structure for installing a high-voltage equipment component to a vehicle according to an embodiment of the invention will be described below by reference to the accompanying drawings. Note that when used in the following description of the invention, position indicating terms such as front, rear, left and right denote, respectively, front, rear, left and right to a vehicle when the vehicle drives forwards.

This embodiment is applied to a hybrid vehicle which run by controlling appropriately a driving force of an internal combustion engine, not shown, and a driving force or a running electric motor.

Figure 1:
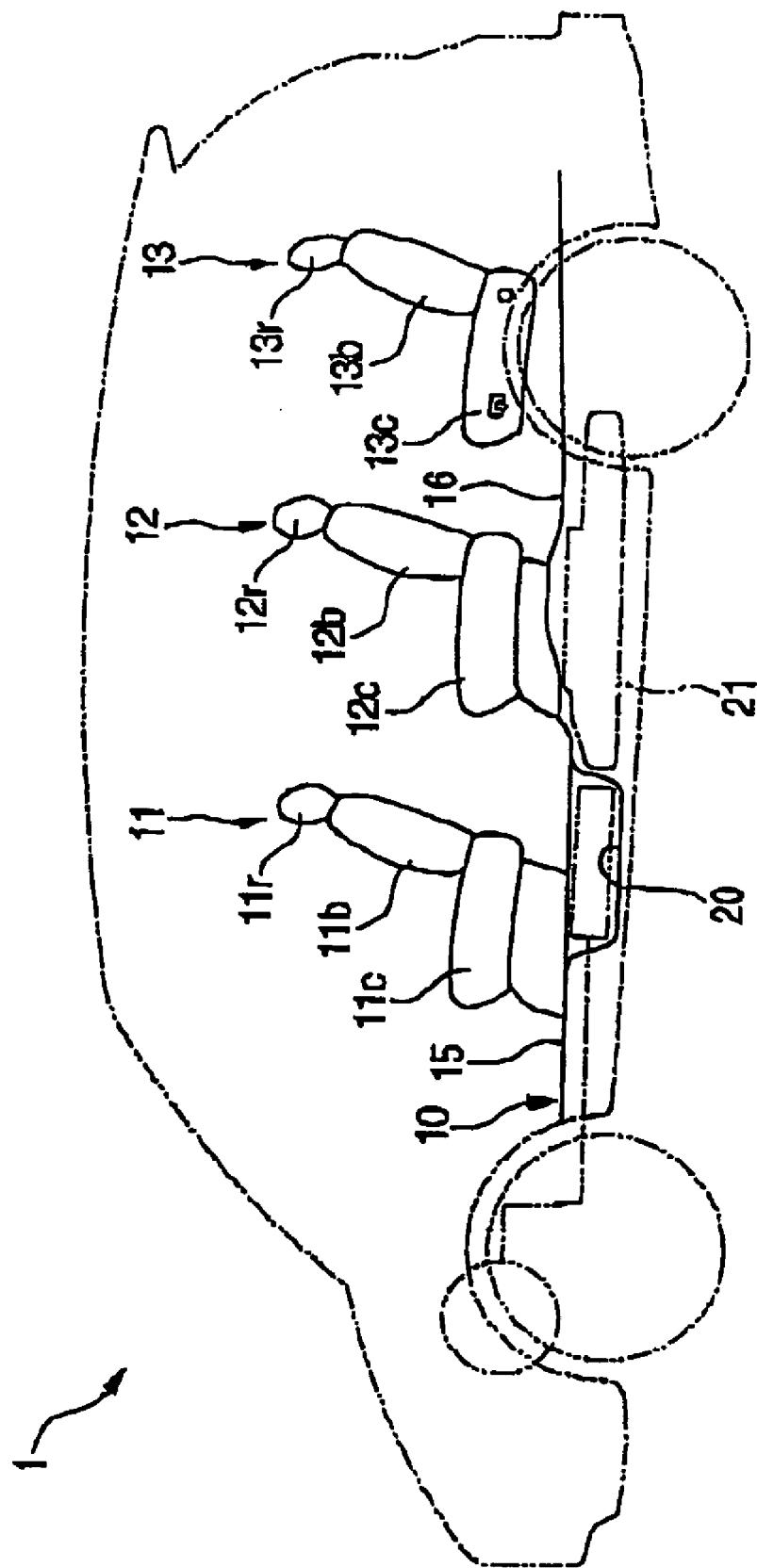
FIG. 1 is a side view schematically showing a vehicle to which an automotive high-voltage equipment component installing structure according to an embodiment of the invention is applied.

In FIG. 1, reference numeral 1 denotes a so-called two-box vehicle. This vehicle 1 has a seat arrangement structure in which three rows of seats comprising a first-row seat 11, a second-row seat 12 and a third-row seat 13 are disposed on a vehicle body floor 10 so as to be arranged in that order from front to rear.

A first floor 15 on which the first-row seat 11 seat 11 is disposed is connected to a second floor 16 which is located at a position which is higher in level than the first floor 15. The second-row seat 12 and the third-row seat 13 are disposed on this second floor 16.

Basically, the respective seats 11, 12, 13 have seat cushions 11c, 12c, 13c which support the hip portions of occupants who are seated on those seats and seat backs 11b, 12b, 13b which support of the back portions of those occupants, and head restraints 11r, 12r, 13r are mounted on the seat backs 11b, 12b, 13b of the first-, second- and third-row seats 11, 12, 13, respectively.

Figure 2:
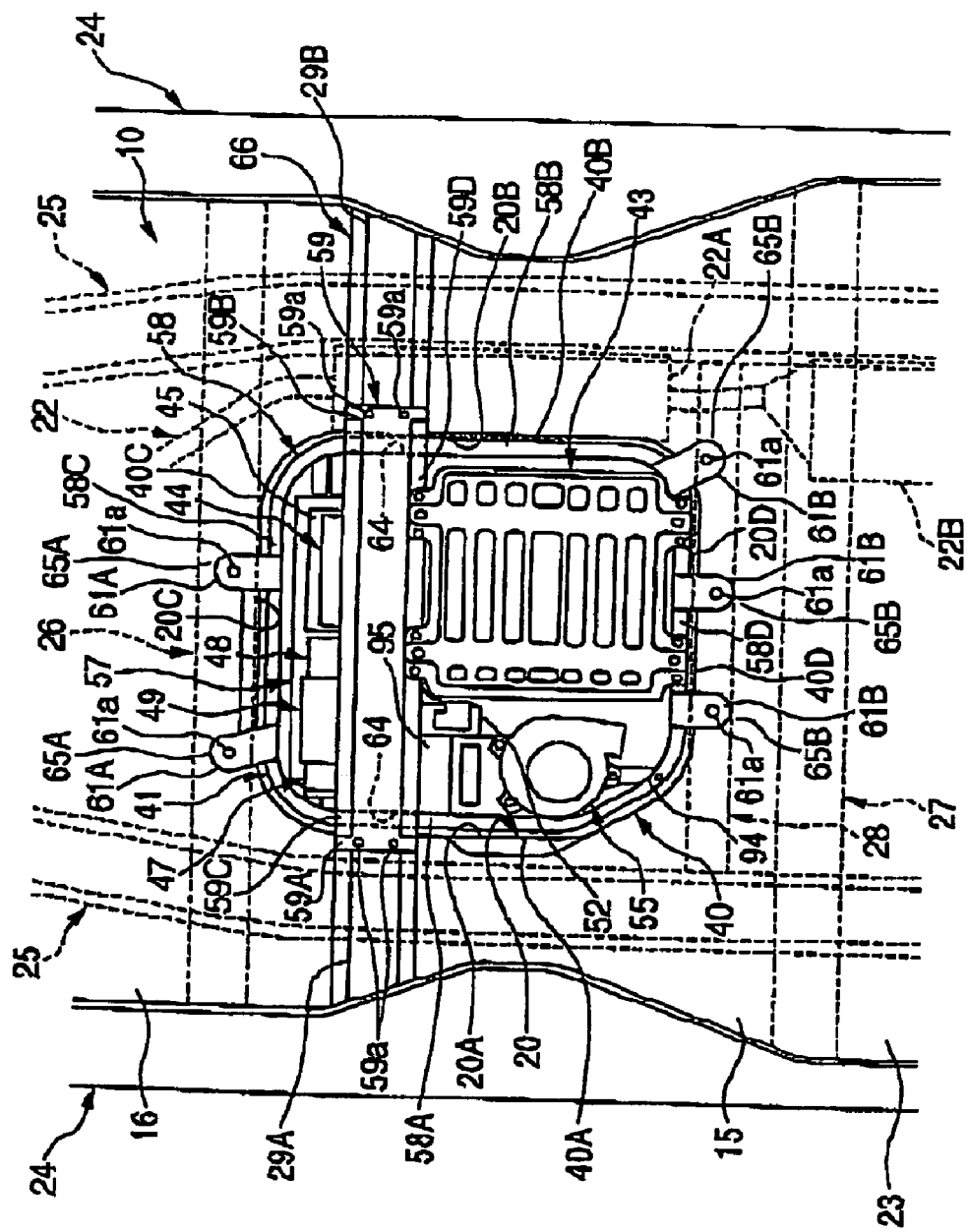
FIG. 2 is a plan view showing the automotive high-voltage equipment component installing structure according to the embodiment of the invention.

A downwardly recessed accommodating portion 20 is formed on a side racing the second floor 16 of the first floor 15 on which the first-row seat 11 is placed in such a manner that a front part thereof is covered with the first-row seat 11. In addition, a fuel tank 21 is disposed on a lower side of the second floor 16 in such a tanner as to be located adjacent to a rear end of the recessed accommodating portion 20. In addition, as shown in FIG. 2, on a lower side of the vehicle body floor 10 an exhaust pipe 22 of an internal combustion engine passes by a right-hand side of the recessed accommodating portion 20, and a pre-chamber 22A of the exhaust pipe 22 is positioned on the right-hand side of the recessed accommodating chamber 20 and a silencer 22B of the exhaust pipe 22 is positioned rearward of the recessed accommodating portion 20.

To further describe the vehicle body floor 10, left and right side sills (vehicle body framework portions) 24 which extend along a longitudinal direction of a vehicle are provided on transverse sides of a floor panel 23. Further, left and right side frames (vehicle body framework portions) 25 which extend along the longitudinal direction are provided on a lower side of the floor panel 23 at positions between the side sills 24. Here, while not shown, cross sections of the left and right side sills 24 which intersect at right angles with the longitudinal direction are each formed into a closed cross-sectional shape, and cross sections formed by the left and right side frames 25 and the floor panel 23 which intersect at right angles with the longitudinal direction are also each formed into a closed cross-sectional shape.

In addition, across member (a vehicle body framework portion, a reinforcement member) 26 is provided on the lower side of the floor panel 23 at a boundary position between the first floor 15 and the second floor 16 in such a manner as to extend along a transverse direction of the vehicle so as to connect the left and right side sills 24 together while intersecting with the left and right side frames 25. Further, a cross member (a vehicle body framework portion) 27 is also provided on the lower side of the floor panel 23 rearward of the cross member 26 in such a manner as to extend along the transverse direction so as to connect the left and right side sills 24 together while intersecting with the left and right side frames 25.

Additionally, a cross member (a vehicle body framework portion, a reinforcement member) 28 is provided on the lower side of the floor panel 23 close to a front side of the rearward cross member 27 in such a manner as to extend along the transverse direction so as to connect the left and right side frames 25 together. Here, while not shown, cross sections of these cross members 26 to 28 which intersect at right angles with the transverse direction are each formed into a closed cross-sectional shape.

Cross member separate portions (vehicle body framework portions) 29A, 29B are provided on an upper side of the floor panel 23 which are close to the front cross member 26 and which extend, respectively, from the left and right side sills 24 transversely inwardly.

Figure 4:
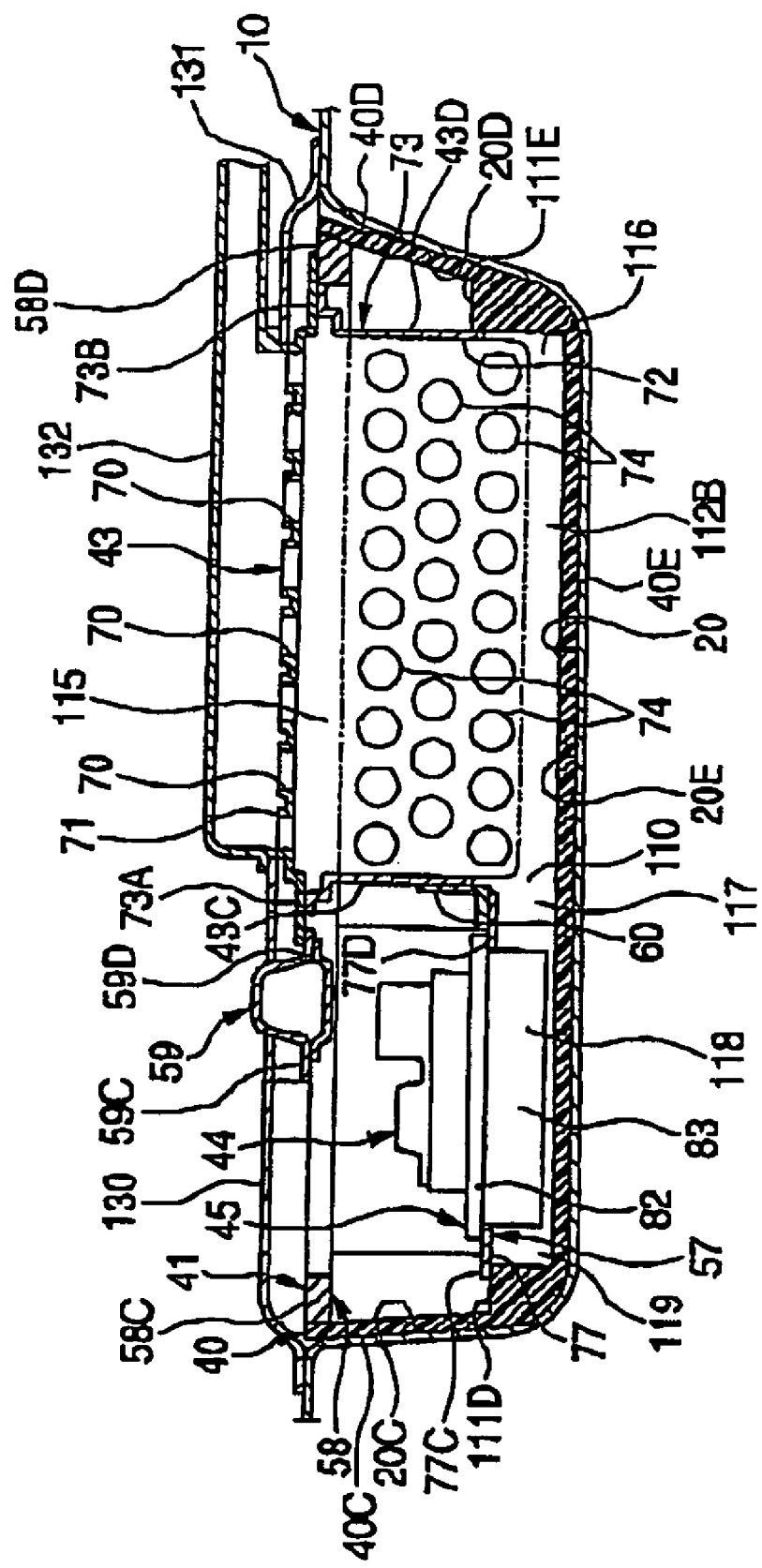
FIG. 4 is a right-hand side sectional view showing the automotive high-voltage equipment component installing structure according to an embodiment of the invention.

Then, the aforesaid downwardly recessed accommodating portion 20 is formed on the floor panel 23 at a position located between the left and right side frames 25, between the front and rear cross members 26, 28 and between the left and right cross member separate portions 29A, 29B. This recessed accommodating portion 20 is formed into a substantially square shape as viewed from the top which has a left-hand wall portion 20A and a right-hand wall portion 20B which are substantially normal to the transverse direction, a front wall portion 20C and a rear wall portion 20D which are substantially normal to the longitudinal direction and a bottom portion 20E which extends substantially horizontally as shown in FIG. 4.

In this embodiment, a mat member (a heat insulating member) 40 having a recessed shape is fitted in the recessed accommodating portion 20 on the vehicle body floor 10, and thereafter, a high-voltage equipment component 41 for driving a running electric motor, not shown, is disposed in the recessed accommodating portion 20 in a state in which the component is suspended from the vehicle body floor 10. Referring to FIGS. 2 to 6, the high-voltage equipment component 41 will be described.

Figure 3:
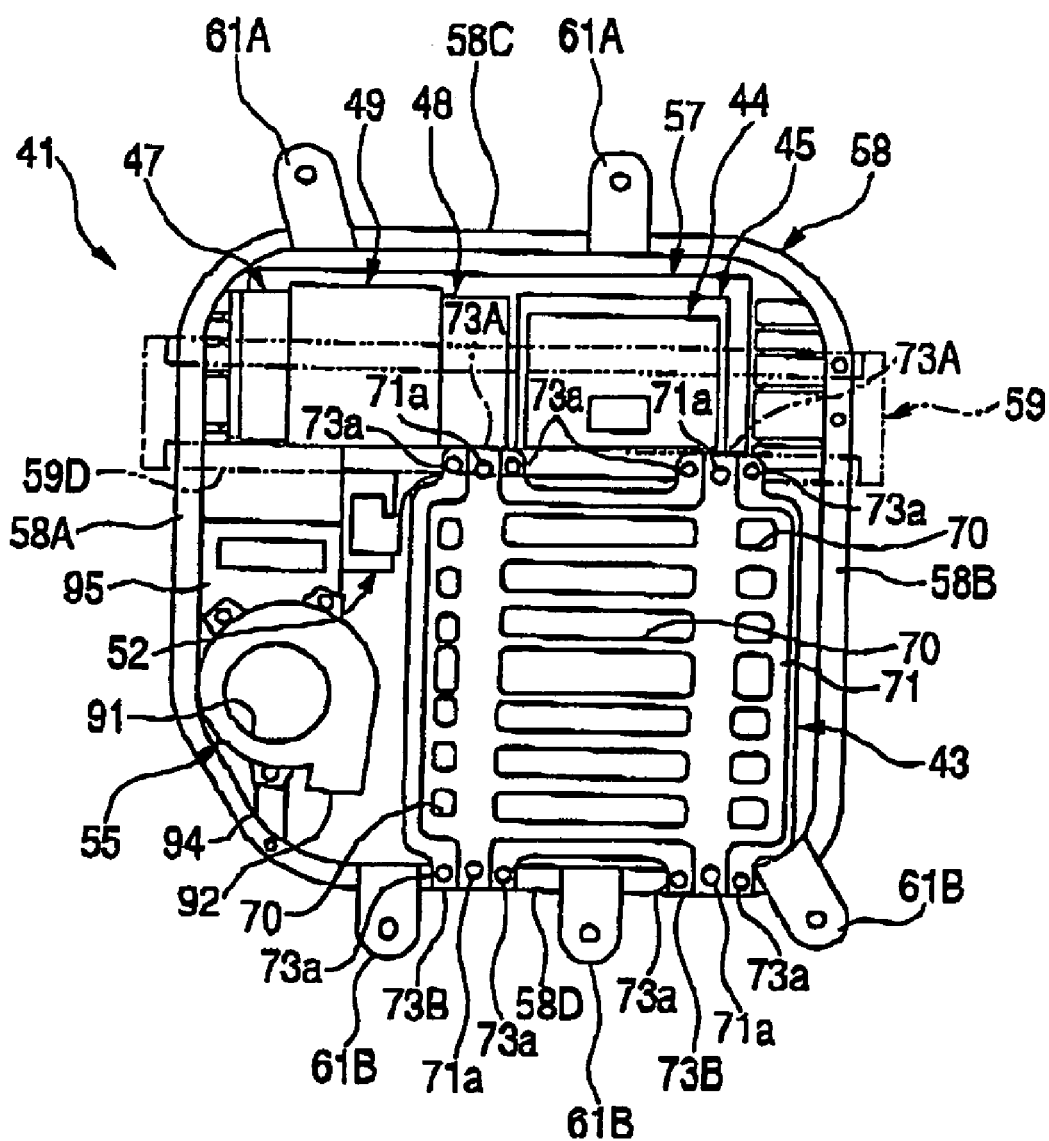
FIG. 3 is a plan view of a high-voltage equipment component.

As shown in FIG. 3, the high-voltage equipment component 41 has an electrical energy storable battery box (high-voltage equipment) 43 at a rear right-hand side portion thereof, and has a power drive unit (high-voltage equipment) 44 on a front side of the battery box 43 or at a front right-hand side portion thereof. Furthermore, the high-voltage equipment component 41 has a heat sink 45, shown also in FIG. 4 on a lower side of the power drive unit 44. The electrical energy storable battery box 43 exchanges electric power with the running electric motor, not shown. The power drive unit 44 includes an inverter for controlling the driving of the running electric motor. The heat sink 45 cools the power drive unit 44.

In addition, as shown in FIG. 31 the high-voltage equipment component 41 has a DC-DC converter (high-voltage equipment) 47 on a left-hand side or the power drive unit 44 or at a front left-hand side portion thereof. Further, the high-voltage equipment component 41 also has a junction box (high-voltage equipment) 48 on the DC-DC converter 47 on a right-hand side thereof, and has a controller (high-voltage equipment) 49 on the DC-DC converter 47 on a left-hand side thereof. The DC-DC converter 47 converts a high-voltage for the running electric motor into a low voltage. The junction box 48 and the controller 49 control the power drive unit 44. Furthermore, the high-voltage equipment component 41 has a heat sink 50, also shown in FIG. 5, for cooling the DC-DC converter 47 on the lower side of the DC-DC converter 47.

Figure 6:
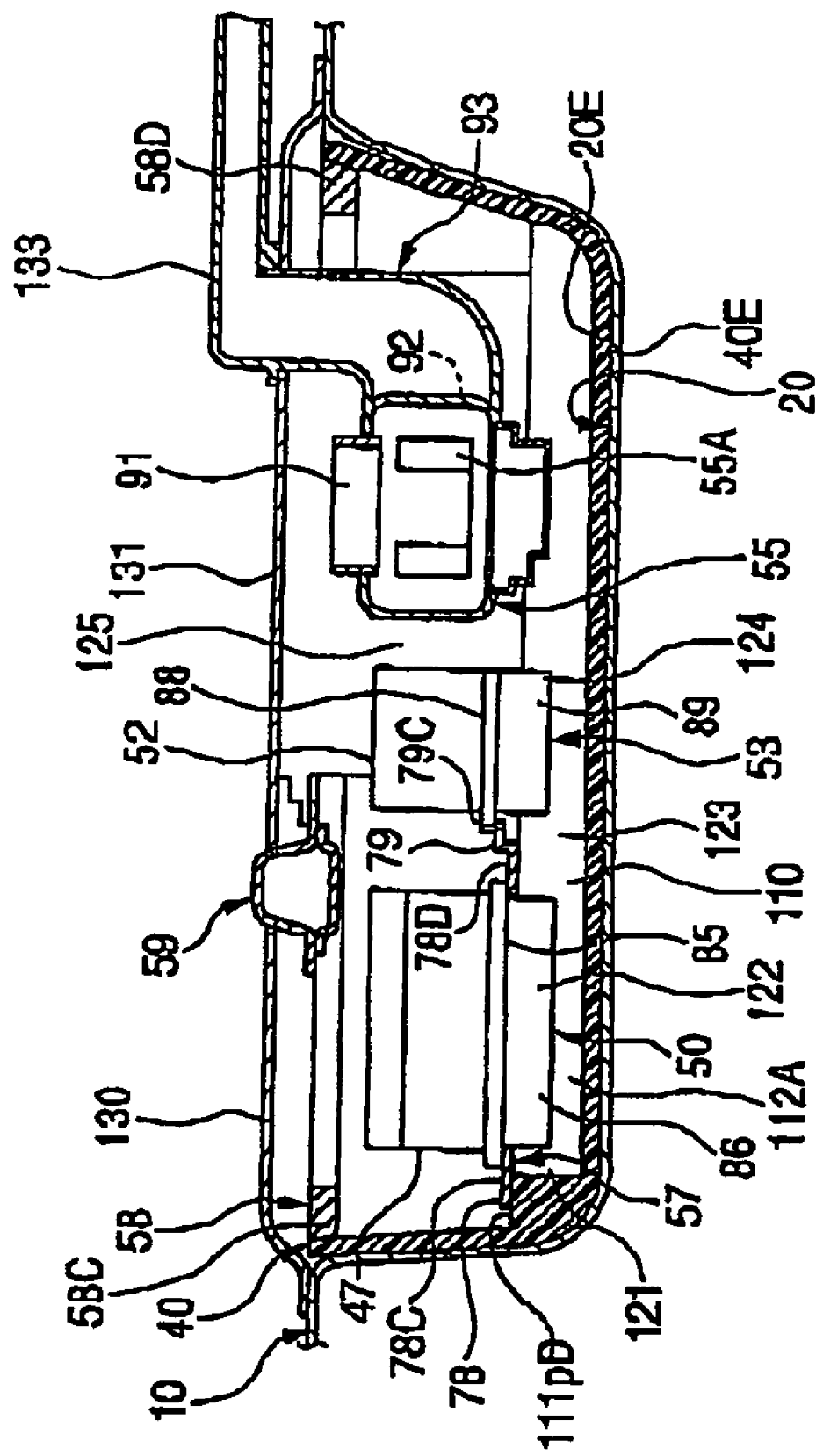
FIG. 6 is a left-hand side sectional view showing the automotive high-voltage equipment component installing structure according to an embodiment of the invention.

Additionally, as shown in FIG. 3, the high-voltage equipment component 41 has an air conditioner inverter 52 for controlling an air conditioner, not shown, behind the DC-DC converter 47 or on the left-hand side of an intermediate portion of the high-voltage equipment component 41, a heat sink 53, also shown in FIG. 6, for cooling the air conditioner inverter 52 on a lower side of the air conditioner inverter 52, and a fan unit 55 rearward of the air conditioner inverter 52 or on the left-hand side of a rear portion of the high-voltage equipment component 41.

Here, as shown in FIG. 3, the high-voltage equipment component 41 has a fixing bracket (a connecting member) 57, and an annular sub-assembly frame 58. The fixing bracket 57 joins integrally together the power drive unit 44, the heat sink 45 for the power drive unit 44, the DC-DC converter 47, the junction box 48, the controller 49, the heat sink 50 (not shown in FIG. 3) for the DC-DC converter 47, the air conditioner inverter 52 and the heat sink 53 (not shown in FIG. 3) for the air conditioner inverter 52. The annular sub-assembly frame 58 joins integrally together the fixing bracket (the connecting member) 57, the battery box 43 and the fan unit 55. Furthermore, the high-voltage equipment component 41 has a cross member separate part 59 that is to be fixed to the sub-assembly frame 58 and an inner cover 60 shown in FIG. 4 for connecting the battery box 43 with the fixing bracket 57.

The respective portions of the high-voltage equipment component 41 will be described further.

As shown in FIG. 2, the sub-assembly frame 58 is such as to be formed into a substantially square annular shape as viewed from the top which has a left-hand side portion 58A and a right-hand side portion 58B which extend along the longitudinal direction, a front side portion 58C for connecting front end portions of the left-hand side portion 59A and the right-hand side portion 58B and a rear side portion 58D for connecting rear end portions of the left-hand side portion 58A and the right-hand side portion 58B. A plurality or mounting brackets 61A extending forward are fixed to the front side portion 58C on an upper side or the sub-assembly frame 58 by means of welding or with bolts, and a plurality of mounting brackets 61B extending rearward are fixed to the rear side portion 58D on the upper side of the sub-assembly frame 58 by means of welding or with bolts.

Here, the front mounting brackets 61A are mounted on front mounting seat portions 65A of the floor panel 23 and the front cross member 26 with volts 61a, and the rear mounting brackets 61B are counted on rear mounting seat portions 65B of the floor panel 23 and the roar cross member 28 with bolts 61a, whereby the sub-assembly frame 58 is fixed to the vehicle body floor 10. Thus, the sub-assembly frame 58 comes to have a shape which follows an interior side of the recessed accommodating portion 20 when mounted on the vehicle body floor. In other words, the left-hand side portion 58A, the right-hand side portion 58B, the front side portion 58C and the rear side portion 58D extend along the left-hand wall portion 20A, the right-hand wall portion 20B, the front wall portion 20C and the rear wall portion 20D, respectively.

The cross member separate part 59 has two recessed mounting portions 64, and is fixed in such a manner as to extend across the sub-assembly frame 58 by being welded or bolted with the left-hand side portion 58A and the right-hand side portion 58B being fitted in these recessed mounting portions 64, respectively. Here, the cross member separate part 59 is provided so as to extend across transversely the recessed accommodating portion 20 with the sub-assembly frame 58 being mounted on the vehicle body floor 10 and is, moreover, connected to the left and right cross member separate portions 29A, 29B disposed spaced apart from each other on both sides of the recessed accommodating portion 20 at mounting flange portions 59A, 59B or the cross member separate part 59 which are positioned at transversely ends thereof.

Thus, by connecting together the left and right cross member separate portions 29A, 29B, the cross member separate part 59 constitutes together with the cross member separate portions 29A, 29B a cross member (a vehicle body framework portion, a reinforce member) 66 which extend transversely so as to connect together the left and right side sills 24.

Thus, the sub-assembly frame 58 is directly connected to a lower portion of the cross member 66 which extends across transversely the recessed accommodating portion 20. Note that a cross section or the cross member separate part 59 which is normal to the transverse direction is formed into a closed cross-sectional shape. In addition, mounting flange portions 59C, 59D which protrude longitudinally are formed on the cross member separate part 59.

As shown in FIGS. 3 and 4, the battery box 43 has a lid 71 having a plurality of openings 70, a rectangular tube-like box main body 73, and a plurality of cylindrical cells 74. In the box main body 73, one side is closed with the lid 71 when the lid 71 fixed with bolts 71a and an opening 72 on an opposite side to the lid 71 is made to open. The plurality of cylindrical cells 74 are disposed in parallel with one another at certain intervals 6 within the box main body 73. Left and right mounting flange portions 73A which extend forward and left and right mounting flange portions 73B which extend rearward are formed on the lid 71. Then, with the lid 71 being placed on an upper side of the box main body 73, the rear mounting flange portions 73B are mounted on an upper surface of the rear side portion 58D of the sub-assembly frame 58 with bolts 73a and the front mounting flange portions 73A are mounted on an upper surface of the rear mounting flange portion 59D of the cross member separate part 59 with bolts 73a.

Figure 10:
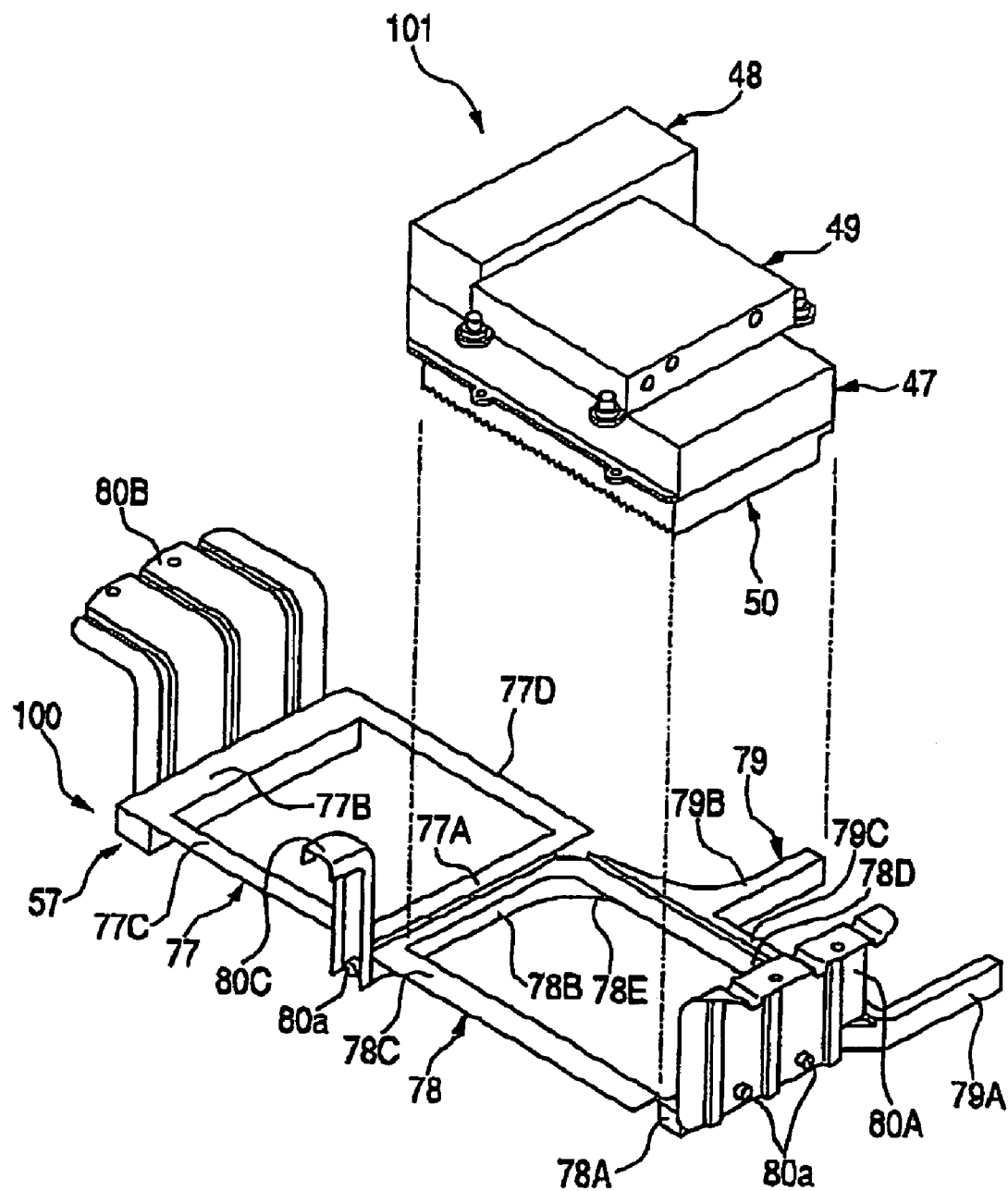
FIG. 10 is a perspective view showing a part of the assembling procedure or the high-voltage equipment component.

The fixing bracket 57 is a forged or die-cast product of aluminum and has, as shown in FIG. 10, a first mounting portion 77 and a second mounting portion 78 which are each formed into a rectangular frame-like shape and which are provided in parallel in the transverse direction and a U-shaped third mounting portion 79 which is provided behind the second mounting portion 78 and which is made to open on an opposite side to a side facing the second mounting portion 78.

Namely, the first mounting portion 77 has thick side portions 77A, 77B which are parallel with each other and thin side portions 77C, 77D which connect upper portions of ends of the side portions 77A, 77B at ends thereof, and the second mounting portion 78 has thick side portions 78A, 78B which are parallel with each other and thin side portions 78C, 78D which connect upper portions at ends of the side portions 78A, 78B at ends thereof. Here, in the first mounting portion 77 and the second mounting portion 78, the side portions 77A, 77B, 78A, 78B are parallel, and the side portion 77A and the side portion 78B are integrated as a single portion.

The third mounting portion 79 has thick side portions 79A, 79B which are parallel with each other and a thin side portion 79C which connects upper portions at one end of the side portions and is provided in such a manner that the side portion 79C is integrated into the side portion 78D of the second mounting portion 78. Here, in the third mounting portion 79, the side portion 79B is made to extend from an intermediate position of the side portion 78D. In addition, an interposed portion 78E of the side portion 78D, 79C which is located between side portion 78B and the side portion 79B is formed into a curved shape and is also made thick so as to provide a smooth continuity from the side portion 78B to the side portion 79B.

Mounting brackets 80A, 80B are fixed, respectively, to outer sides of the opposite sides or the side portion 78A and the side portion 77B of the second mounting portion 78 and the first mounting portion 77 with bolts 80a in such a manner as to erect outwardly therefrom, and a mounting bracket 80C is fixed with a bolt 80a in such a manner as to erect outwardly from a position between the first mounting portion 77 and the second mounting portion 78.

Figure 14:
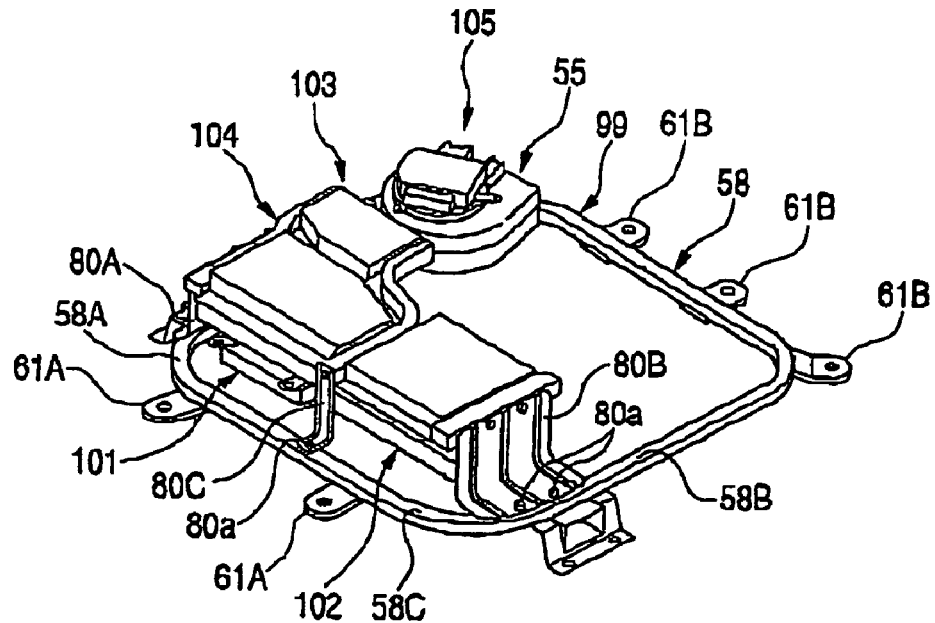
FIG. 14 is a perspective view showing a part of the assembling procedure of the high-voltage equipment component which occurs after the parts of the assembling procedure shown in FIGS. 9 and 13.

As shown upside down in FIG. 14, the fixing bracket 57 comes to be suspended from the sub-assembly frame 58 by fixing with bolts 80a the mounting bracket 80A to a lower side of the left-hand side portion 58A of the sub-assembly frame 58, the mounting bracket 80B to a lower side of the right-hand side portion 58B of the sub-assembly frame 58, and the mounting bracket 80C to a lower side of the front side portion 58C of the sub-assembly frame 58, respectively.

Figure 5:
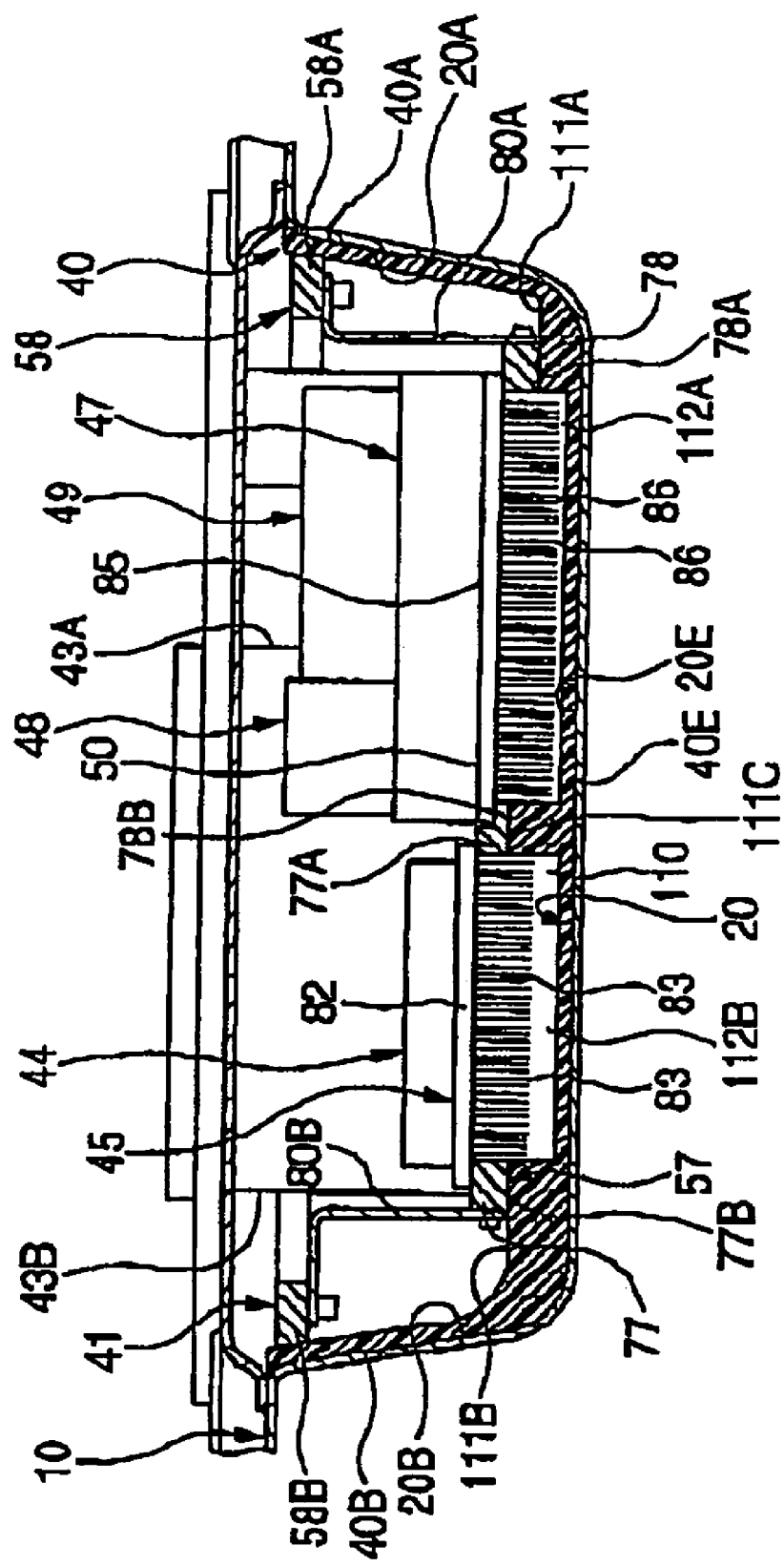
FIG. 5 is a front sectional view showing the automotive high-voltage equipment component installing structure according to an embodiment of the invention.

As shown in FIGS. 4 and 5, the power drive unit 44 is mounted on the heat sink 45, and this heat sink 45 has a resting plate portion 82 for resting the power drive unit 44 thereon and a plurality of parallel fins 83 which protrude to an opposite side to the power drive unit 44 rested on the resting plate portion 82. Then, the power drive unit 44 is fixed to an upper side of the first mounting portion 77 at the resting plate portion 82 with the heat sink 45 being placed therebelow and the fins 83 of the heat sink 45 being inserted into the inside of the first mounting portion 77 of the fixing bracket 57. Here, the respective fins 83 of the heat sink 45 are disposed in parallel in the transverse direction while being oriented so as to be normal to the transverse direction.

The DC-DC converter 47 is mounted on the heat sink 50 as shown in FIGS. 5 and 6, and this heat sink 50 has a resting plate portion 85 for resting the DC-DC converter 47 thereon and a plurality of parallel fins 86 which protrude to an opposite direction to the DC-DC converter 47 rested on the resting plate portion 85. Note that the junction box 48 and the controller 49 are mounted on an opposite side of the DC-DC converter 47 relative to the heat sink 50. Then, the DC-DC converter 47 is fixed to an upper side of the second mounting portion 78 at the resting plate portion 85 with the heat sink 50 being placed therebelow and the fins 86 of the heat sink 50 being inserted into the inside of the second mounting portion 78 of the fixing bracket 57. Here, the respective fins 86 of the heat sink 50 are disposed in parallel in the transverse direction while being oriented so as to be normal to the transverse direction.

The air conditioner inverter 52 is mounted on the heat sink 53 as shown in FIG. 6, and this heat sink 53 has a resting plate portion 88 for resting the air conditioner inverter 52 thereon and a plurality of parallel fins 89 which protrude to an opposite side to the air conditioner inverter 52 rested on the resting plate portion 88. Then, the air conditioner inverter 52 is fixed to an upper side of the third mounting bracket 79 at the resting plate portion 88 with the heat sink 53 being placed therebelow and the fins 89 of the heat sink 53 being inserted into the inside of the third mounting portion 79 of the fixing bracket 57. Here, the respective fins 89 of the heat sink 53 are disposed in parallel in the transverse direction while being oriented so as to be normal to the transverse direction.

The fan unit 55 has an induction port opening 91 axially above a rotational shaft of the fan 55A and an exhaust opening 92 radially of the fan 55A, and an exhaust duct 93 is attached to the exhaust opening 92. With the induction opening 91 being made to face upwardly, this fan unit 55 is attached at a rear portion thereof to a lower side of the rear side portion 58D of the sub-assembly frame 58 via a mounting bracket 94 shown in FIG. 3 and is attached at a front end portion thereof to a lower side of the rear mounting flange portion 59D of the cross member separate part 59 via a mounting bracket 95.

Next, a procedure for integrating the constituent or integral components into the high-voltage equipment component 41 that is constructed as has been described heretofore will be described below.

Figure 8:
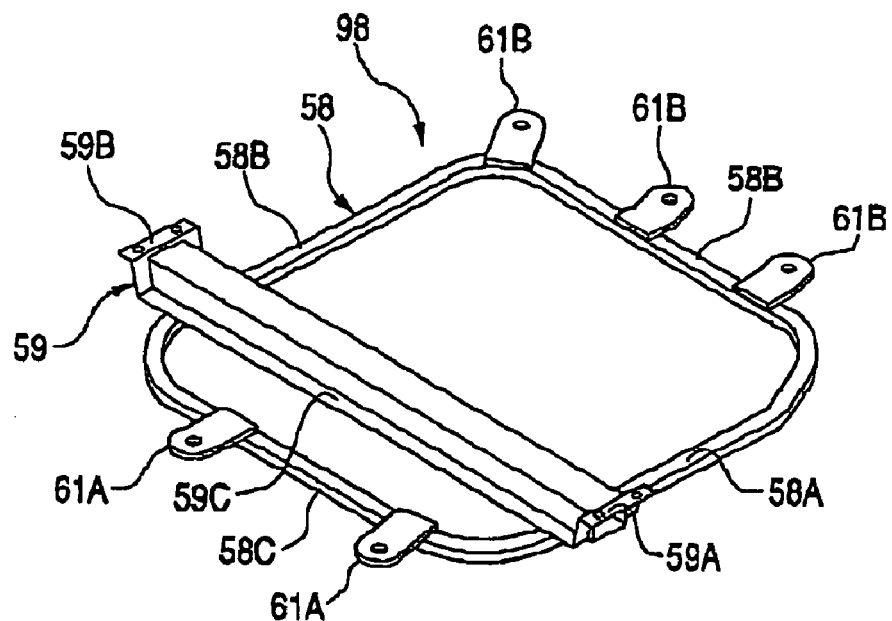
FIG. 8 is perspective view showing an assembling procedure of the high-voltage equipment component.
Figure 9:
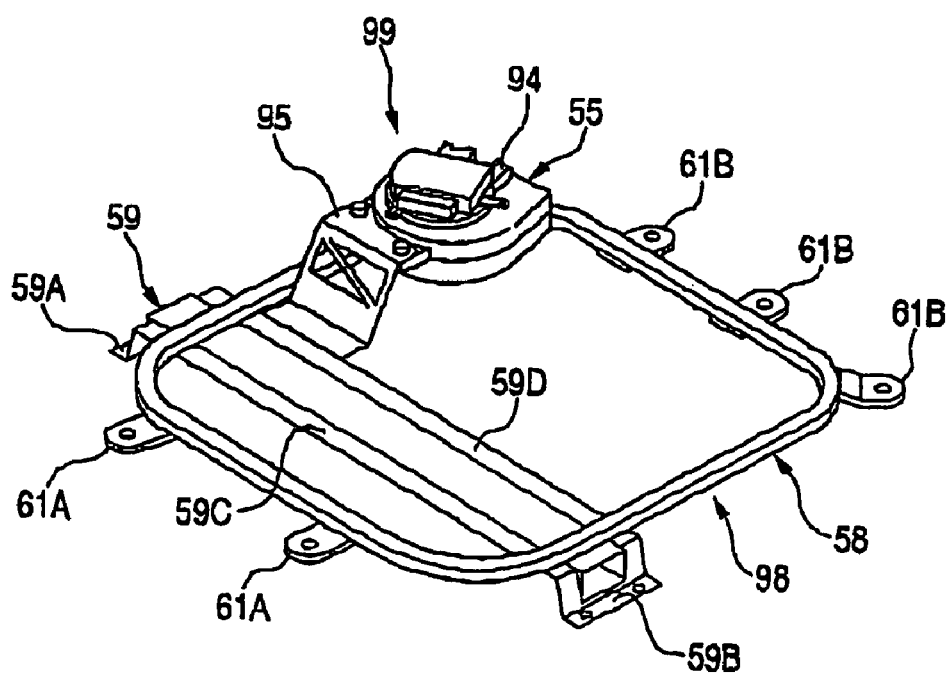
FIG. 9 is a perspective view showing a part of the assembling procedure of the high-voltage equipment component which occurs after the part of the procedure shown in FIG. 8.

Firstly, a first assembly unit 98 in which the mounting brackets 61A, 61B and the cross member separate part 59 are mounted in advance on the upper side of the sub-assembly frame 58 by way of welding as shown in FIG. 8 is turned upside down so that the mounting brackets 61A, 61B and the cross member separate part 59 are placed to face downwardly. Then, the rear portion of the fan unit 55 is attached to the sub-assembly frame 58 with the bolts via the mounting bracket 94, and the front portion of the fan unit 55 is attached to the flange portion 59D of the cross member separate part 59 with the bolts via the mounting bracket 95. A second assembly unit 98 constructed like this is fabricated in a sub-assembly process.

Figure 11:
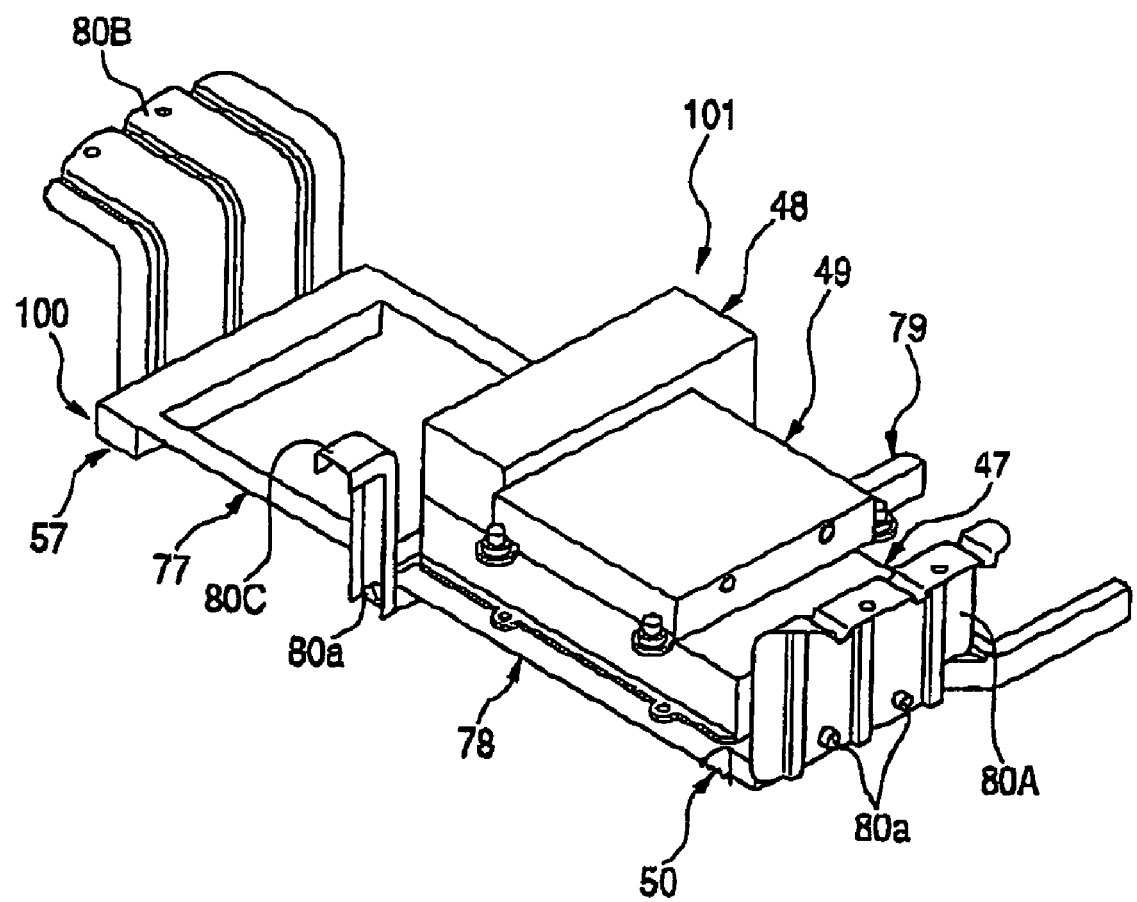
FIG. 11 is a perspective view showing a part of the assembling procedure of the high-voltage equipment component which occurs after the part of the assembling procedure shown in FIG. 10.

On the other hand, a fourth assembly unit 101 in which the heat sink 50, the DC-DC converter 47, the junction box 48 and the controller 49 are assembled in advance in the sub-assembly process is assembled with bolts to the second mounting portion 78 of a third assembly unit in which the fixing bracket 57 and the mounting brackets 80A, 80B, 80C are mounted with the bolts 80a in advance in the sub-assembly process as shown in FIG. 10, and a state shown in FIG. 11 results.

Figure 12:
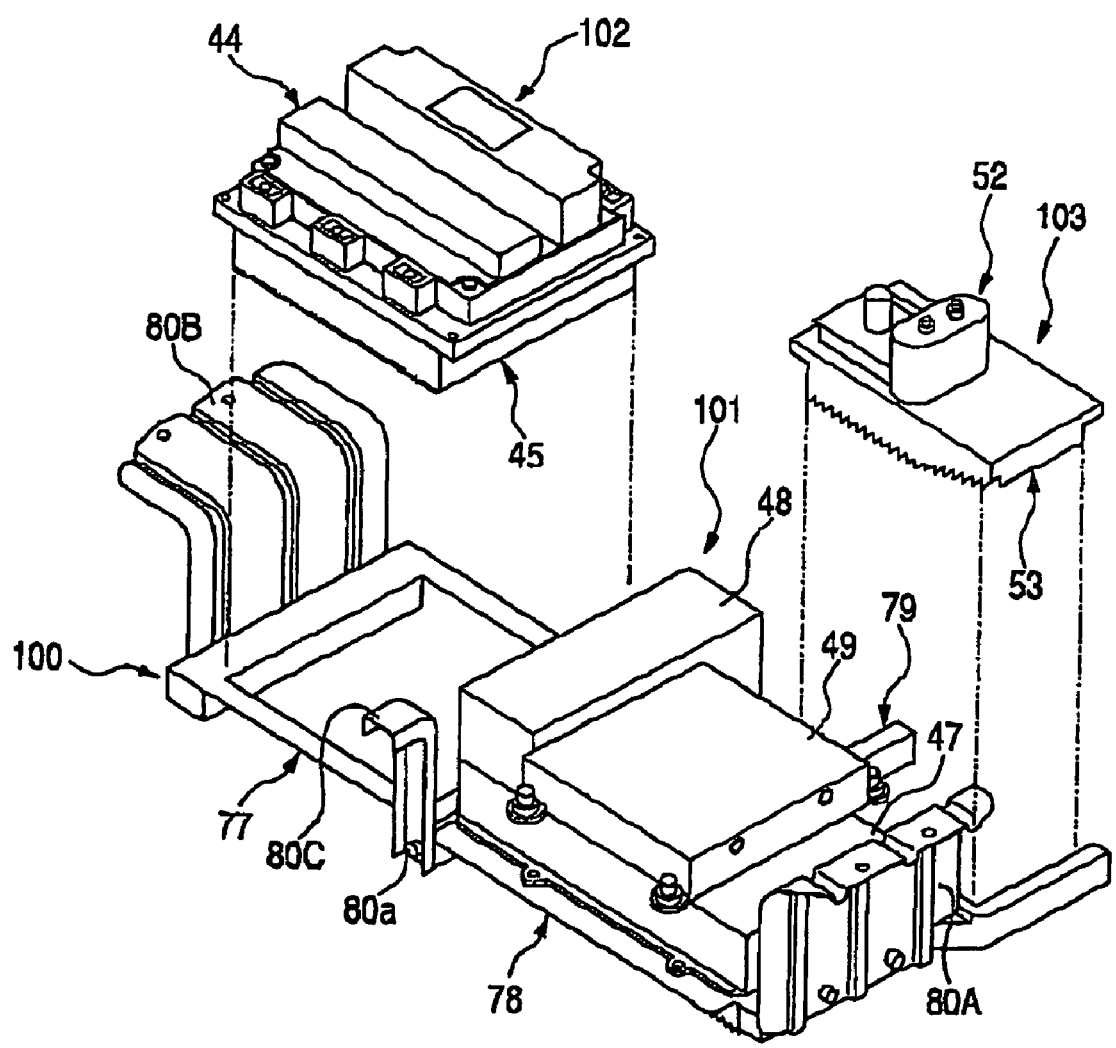
FIG. 12 is a perspective view showing a part of the assembling procedure of the high-voltage equipment component which occurs after the part of the assembling procedure shown in FIG. 11.
Figure 13:
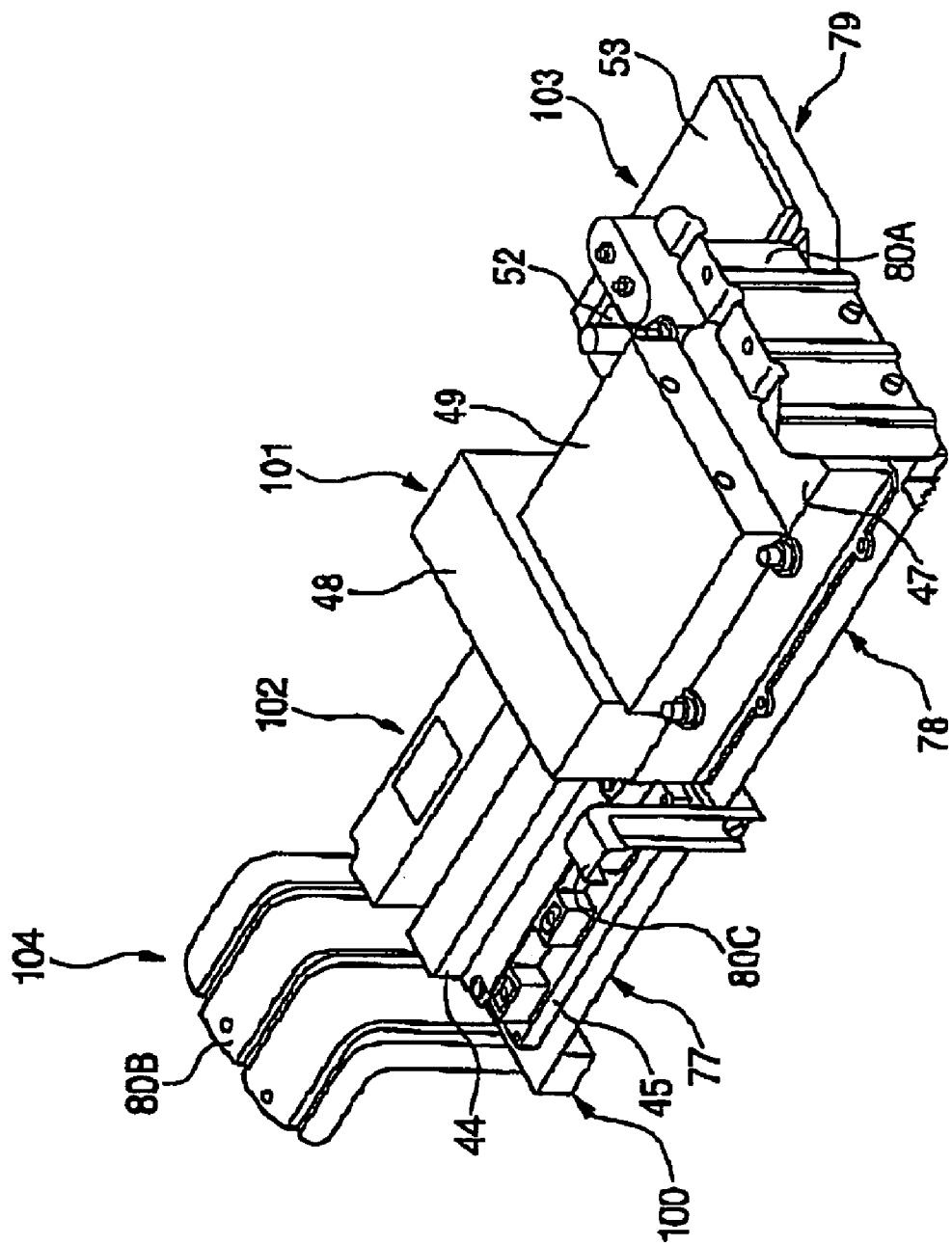
FIG. 13 is a perspective view showing a part of the assembling procedure of the high-voltage equipment component which occurs after the part of the assembling procedure shown in FIG. 12.

Next, as shown in FIG. 12, a fifth assembly unit 102 in which the heat sink 45 and the power drive unit 44 are assembled in advance in the sub-assembly process is assembled to the first mounting portion 77 of the third assembly unit with bolts, and a sixth assembly unit 103 in which the heat sink 53 and the air conditioner inverter 52 are assembled in advance in the sub-assembly is assembled to the third mounting portion 79 of the third assembly unit 100 with bolts, and a seventh assembly unit 104 shown in FIG. 13 results. Thus, the seventh assembly unit 104 that is constructed like this is fabricated in the sub-assembly process.

Then, the seventh assembly unit 104 is turned upside down as shown in FIG. 14, and is then attached to the sub-assembly frame 58 of the second assembly unit 99 with the bolts 80a at the mounting brackets 80A, 80B, 80C thereof, whereby an eighth assembly unit 105 is fabricated.

Figure 7:
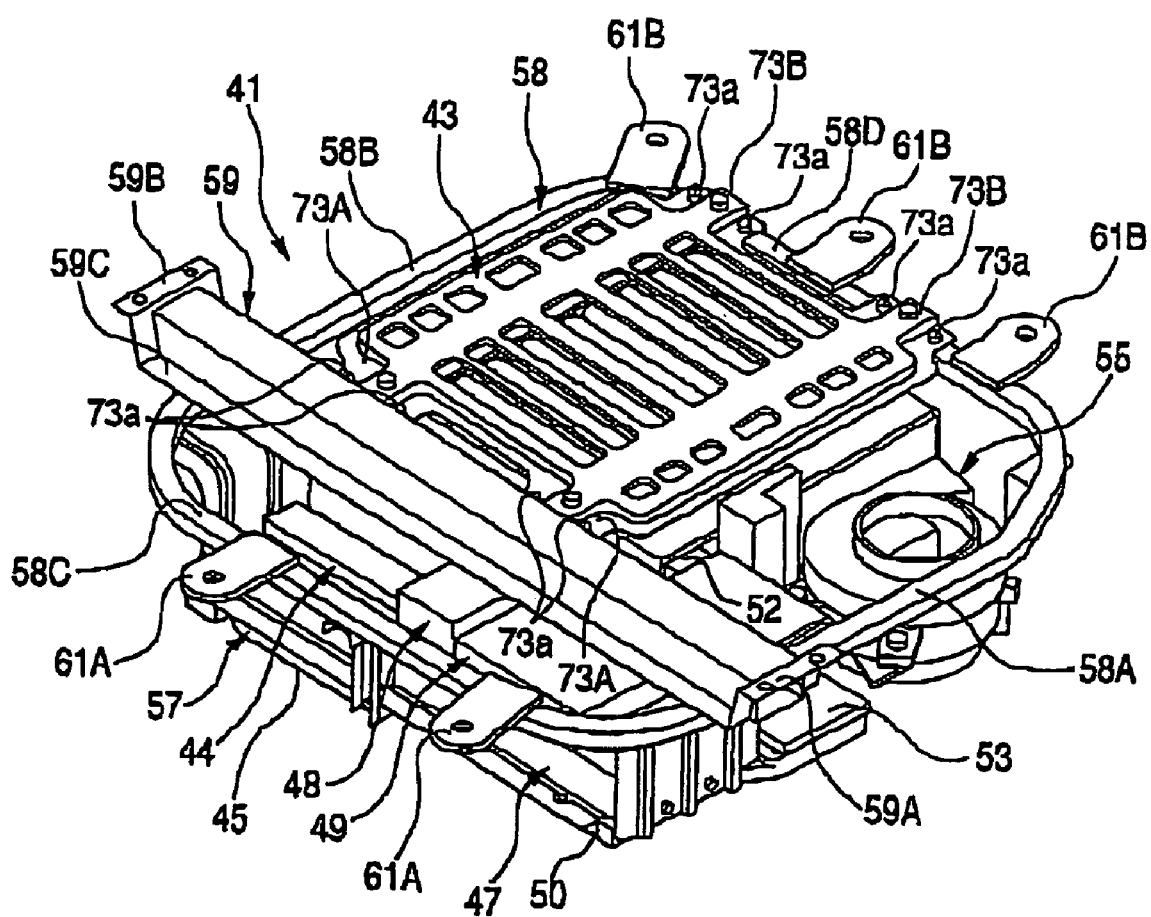
FIG. 7 is a perspective view showing the high-voltage equipment component.
Figure 15:
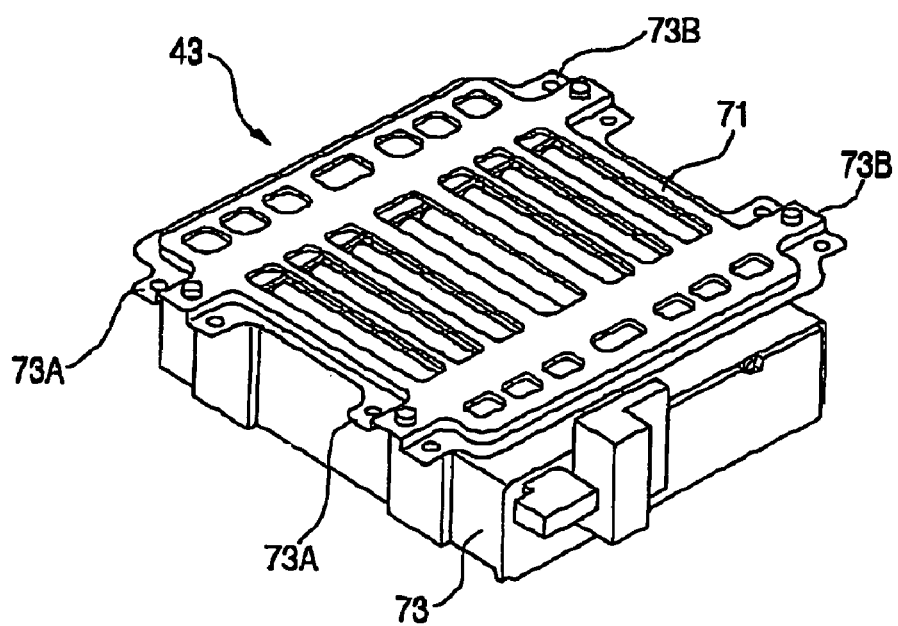
FIG. 15 is a perspective view showing a battery box.

Next, the eighth assembly unit 105 is turned over again to be restored to the original position, and the mounting flange portions 73A, 73B of the battery box 43 shown in FIG. 15 is attached to the sub-assembly frame 58 and the cross member separate part 59 with the bolts 73a as shown in FIG. 3. Here, the inner cover 60 shown in FIG. 4 is attached to the battery box 43, and this inner cover 60 closes a gap between the fixing bracket 57 and the battery box 43. Thus, the high-voltage equipment component 41 is fabricated in which as shown in FIG. 7, the battery box 43, the power drive unit 44, the heat sink 45 therefor, the DC-DC converter 47, the heat sink 50 therefor, the junction box 48, the controller 49, the air conditioner inverter 52, the heat sink 53 therefor and the fan unit 55 are held integrally inside the frame-like sub-assembly frame 58.

Then, the high-voltage equipment component 41 constructed as described above is inserted into the recessed accommodating portion 20 in which the mat member 40 is disposed in advance on the vehicle body floor 10 from above with the sub-assembly frame 58 being made to face upwardly and each equipment being disposed described above, that is, the battery box 43 is positioned at the rear right-hand side, the power drive unit 44 at the front right-hand side, the DC-DC converter 7 at the front left-hand side, and the fan unit 55 at the rear left-hand side, and furthermore, with the fixing bracket 57 being made to extend in the transverse direction at the front portion.

Figure 17:
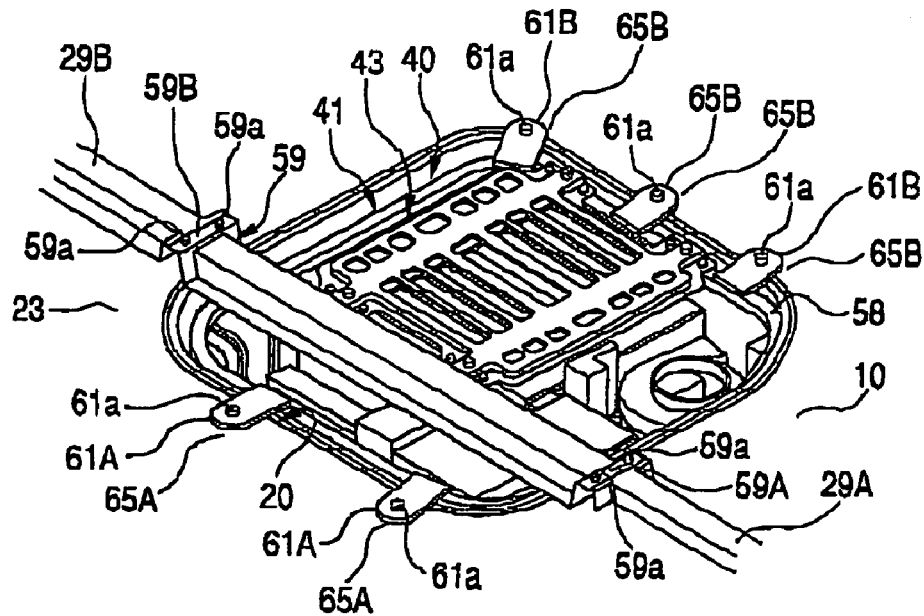
FIG. 17 is a perspective view showing a part of the installing procedure or the high-voltage equipment component which occurs after the part of the installing procedure shown in FIG. 15.

Following this, as shown in FIGS. 2 and 17, the front mounting brackets 61A of the sub-assembly frame 58 are mounted on the front mounting seat portions 65A of the floor panel 23 and the front cross member 26 with the bolts 61a, and the rear mounting brackets 61B of the sub-assembly frame 58 are mounted on the rear mounting seat portions 65B of the floor panel 23 and the rear cross member 28 with the bolts 61a, whereby the high-voltage equipment component 41 is fixed to the vehicle body floor 10.

In addition, in the high-voltage equipment component 41, while being made to extend across the recessed accommodating portion 20 in the transverse direction, the cross member separate part 59 is fixed to the left and right cross member separate portions 29A, 29B which are disposed apart from each other on the sides of the recessed accommodating portion 20 at the mounting flange portions 59A, 59B which are located at the ends of the cross member separate part 59.

In this state, the high-voltage equipment component 41 is, as shown in FIGS. 4 to 6, allowed to have a vertical interval relative to the bottom portion 20E of the recessed accommodating portion 20, and as a result, the high-voltage equipment component 41 comes to be accommodated in the recessed accommodating portion 20 in a suspended state via the sub-assembly frame 58 which is supported on the vehicle body floor 10. In addition, in this state, the sub-assembly frame 58 is, as shown in FIG. 2, connected indirectly to the cross members 26, 28 which are provided on the lower side of the vehicle body floor 10 via the mounting brackets 61A, 61B and is connected directly to the cross member which is provided on the upper side of the vehicle body floor 10. The sub-assembly frame 58 is preferably connected to the reinforcement members such as the cross member 66 at least by way of the indirect connection via the brackets or the direct connection.

The mat member 40 which is interposed between the high-voltage component 41 arranged in the recessed accommodating portion 20 in the suspended state and the bottom portion 20E of the recessed accommodating portion 20 is, as shown in FIGS. 4 to 6, allowed to form a cooling air flow path (a passageway) 110 for allowing cooling air to flow to the high-voltage equipment component 41.

The mat member 40 is arranged so as to prevent the ingress of heat and is formed of a resilient heat insulating member such as a foamed urethane sheet. The mat member 40 has, as shown in FIG. 2, a left-hand wall portion 40A disposed along the left-hand wall portion 20A of the recessed accommodating portion 20, a right-hand wall portion 40B disposed along the right-hand wall portion 20B of the recessed accommodating portion 20, a front wall portion 40C disposed along the front wall portion 20C of the recessed accommodating portion 20, and a rear wall portion 40D disposed along the rear wall portion 20D of the recessed accommodating portion 20, as well as a bottom portion 40E disposed along the bottom portion 20E of the recessed accommodating portion 20 as shown in FIGS. 4 to 6.

Figure 18:
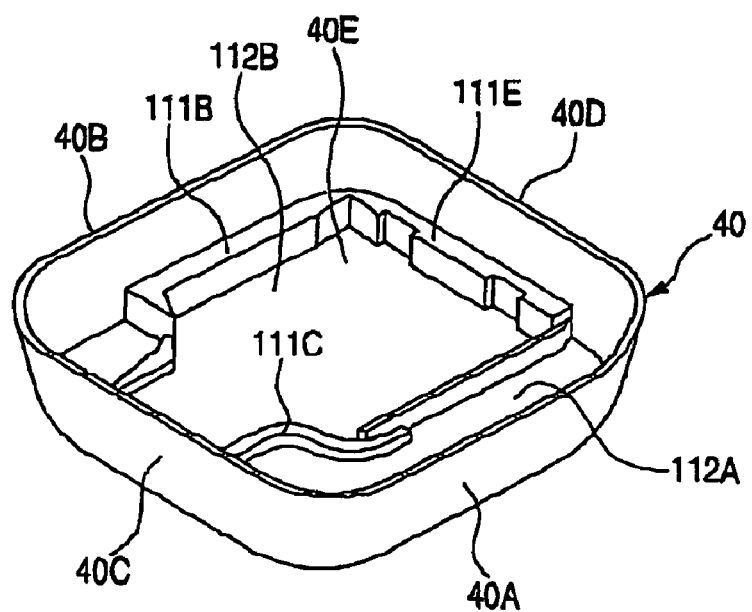
FIG. 18 is a perspective view showing a mat member as viewed from the front.
Figure 19:
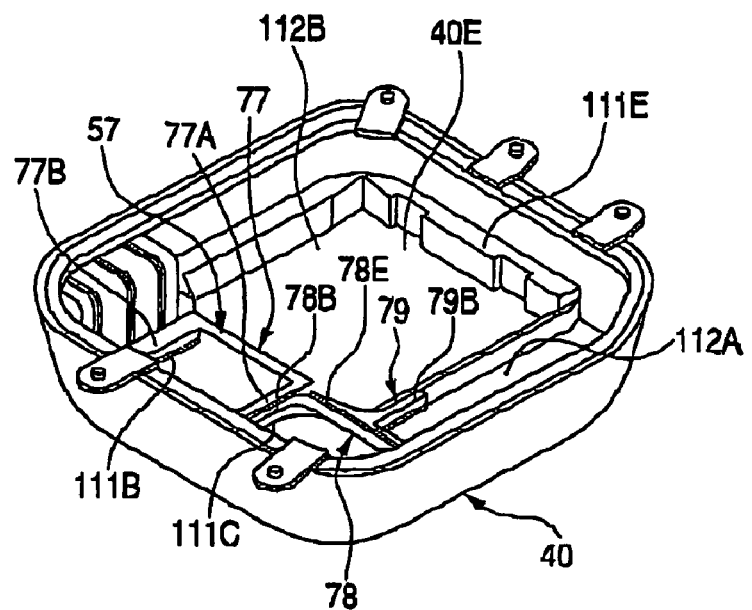
FIG. 19 is a perspective view showing the mat member and a fixing bracket as viewed from the front.
Figure 20:
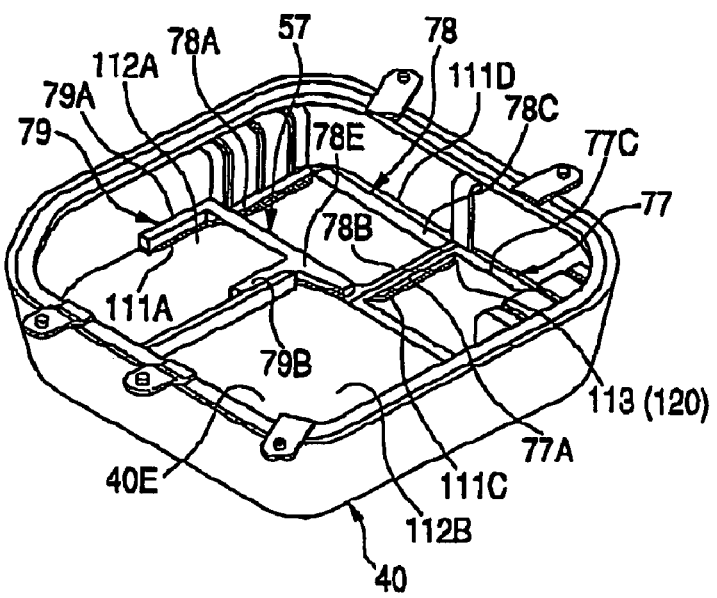
FIG. 20 is a perspective view showing the mat member and the fixing bracket as viewed from the rear.

As shown in FIGS. 18 to 20, inner wall portions 111A to 111C which extend substantially along the longitudinal direction are provided a left end portion, a right end portion and a transversely intermediate portion of the bottom portion 40E, respectively, in such a manner as to erect from the respective portions, and inner wall portions 111D, 111E which extend substantially along the transverse direction are also provided at a front end and a rear end of the bottom portion 40E in such a manner as to erect therefrom. As a result, recessed flow path forming portions 112A, 112B which are recessed downwardly are formed on the bottom portion 40E on both transverse sides thereof or between the inner wall portions 111A, 111C and between the inner wall portions 111C, 111B, respectively. Note that the front inner wall portion 111D and the inner wall portion 111C are spaced apart and as a result, a flow path forming groove 113 which is recessed downwardly so as to establish a transverse communication between the recessed flow path forming portions 112A, 112B is formed, as shown in FIG. 20, between these wall portions.

Then, the high-voltage equipment component 41 is suspended in the recessed accommodating portion 20 as has been described above with the heat sink 45 for the power drive unit 45 being disposed in the recessed flow path forming portion 112B as shown in FIG. 4 and the heat sink 50 for the DC-DC converter 47 and the heat sink 53 for the air conditioner inverter 52 being disposed in the recessed flow path forming portion 112A as shown in FIG. 6.

In addition, in this suspended state or the high-voltage equipment component 41, as shown in FIGS. 20 and 4, the front side portions 77C, 78C of the fixing bracket 57 are brought into full abutment with an upper side of the inner wall portion 111D at continuing lower surfaces thereof to thereby compress and deform the inner wall portion 111D, resulting in a firm adherence of the side portions 77C, 78C to the inner wall portion 111D.

In the same suspended state, as shown in FIGS. 20 and 5, the side portions 78A, 79A of the fixing bracket 57 are brought into full abutment with an upper side of the inner wall portion 111A at continuing lower surfaces thereof to thereby compress and deform the inner wall portion 111A, resulting in a firm adherence of the side portions 78A, 79A to the inner wall portion 111A.

In the same suspended state, as shown in FIGS. 19 and 5, the side portion 77B of the fixing bracket 57 is brought into full abutment with an upper side of the inner wall portion 111B at continuing lower surfaces thereof to thereby compress and deform the inner wall portion 111B, resulting in a firm adherence of the side portions 77B to the inner wall portion 111B.

In the same suspended state, as shown in FIGS. 19 and 5, the side portions 77A, 78B, the interposed portion 78E and the side portion 79B of the fixing bracket 57 are brought into full abutment with an upper side of the inner wall portion 111C at continuing lower surfaces thereof to thereby compress and deform the inner wall portion 111C, resulting in a firm adherence of the side portions 77A, 79B, the interposed portion 78E and the side portion 79B to the inner wall portion 111C.

Thus, the mat member 40 is pressed so as to be compressed and deformed by the high-voltage equipment component 41 disposed in the recessed accommodating portion 20, and to be more specific, the mat member 40 is pressed so as to be compressed and deformed by the fixing bracket 57 which connect the power drive unit 44, the DC-DC converter 47 and the air conditioner inverter 52 together.

Figure 16:
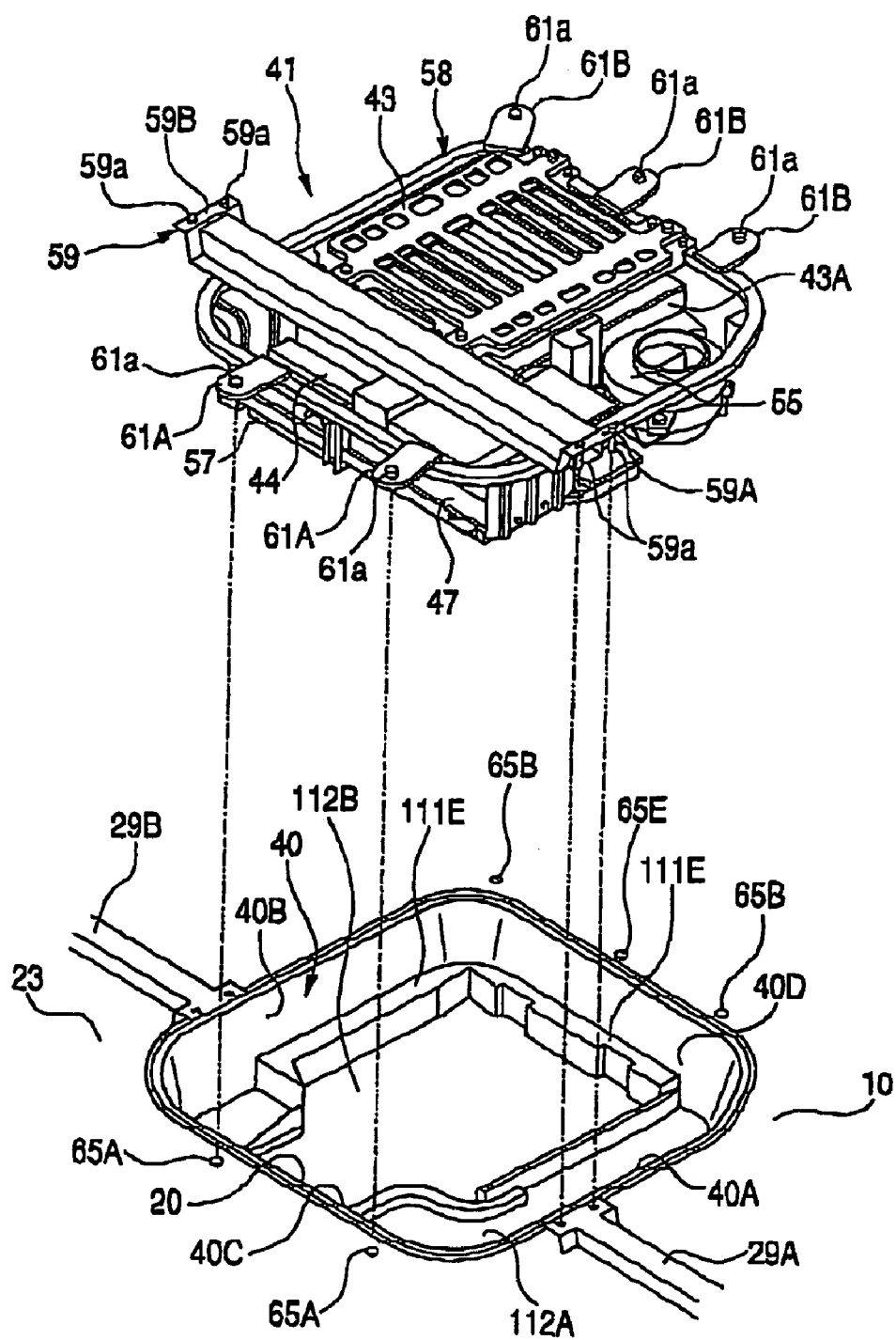
FIG. 16 is a perspective view showing a part of an installing procedure of the high-voltage equipment component which occurs after the part of the assembling procedure of the high-voltage equipment component shown in FIG. 14.

In addition, in the suspended state, a left side portion 43A of the battery box 43 shown in FIG. 5 is brought into firm adherence to an inner surface of the inner wall portion 111C shown in FIG. 16 to thereby seal a gap therebetween, a right side portion 43B of the battery box 43 shown in FIG. 5 is brought into firm adherence to an inner surface of the inner wall portion 111B shown in FIG. 16 to thereby seal a gap therebetween, a rear side portion 43D or the battery box 43 shown in FIG. 4 is brought into firm adherence to an inner surface of the inner wall portion 111E to thereby seal a gap therebetween, and the inner cover 60 mounted on a front side portion 43C of the battery box 43 closes a gap between the battery box 43 and the first mounting portion 77 of the fixing bracket 57. As a result, the entirety of an upper side of the recessed flow path forming portion 112B is closed by the battery box 43, the inner cover 60, the first mounting portion 77 of the fixing bracket 57 and the heat sink 45 of the power drive unit 44.

Additionally, as shown in FIG. 20, an upper side of the flow path forming groove 113 is closed by the first mounting portion 77 and the side portions 77A, 78A of the second mounting portion 78 of the fixing bracket 57.

Furthermore, as shown in FIG. 6, a front upper side of the recessed flow path forming portion 112A is closed by the second mounting portion 78 and the third mounting portion 79 of the fixing bracket 57, the heat sink 50 for the DC-DC converter 47 and the heat sink 53 for the air conditioner inverter 52.

Thus, as shown in FIG. 4, the upper openings 70 of the battery box 43, an inner flow path 115 of the battery box 43, the lower opening 72 of the battery box 43, an inner flow path 116 which is located below the battery box 43 and is surrounded by the bottom portion 40E and the inner wall portions 111B, 111C, 11E, an inner now path 117 which is located between the battery box 43 and the heat sink 45 and is surrounded by the inner cover 60, the side portion 77D of the fixing bracket 57 and the inner wall portions 111B, 111C, an inner flow path 118 which is surrounded by the heat sink 45, the bottom portion 40E and the wall portions 111B, 111C and which passes mainly between the fins 83, an inner flow path 119 which is located between the heat sink 45 and the wall portion 111D and is surrounded by the side portion 77C of the fixing bracket 57, the bottom portion 40E and the wall portions 111B, 111C, 111D, an inner flow path 120 which is surrounded by the fixing bracket 57 and the flow path forming groove 113 shown in FIG. 20, an inner flow path 121 which is located between the heat sink 50 and the wall portion 111D as shown in FIG. 6 and is surrounded by the side portion 78C of the fixing bracket 57, the bottom portion 40E and the wall portions 111A, 111C, 111D, an inner passageway 122 which is surrounded by the heat sink 50, the bottom portion 40E and the wall portions 111A, 111C and which passes mainly between the fins 83, an inner flow path 123 which is located between the heat sink 50 and the heat sink 53 and which is surrounded by the side portions 78D, 79C of the fixing bracket 57, the bottom portion 40E and the wall portions 111A, 111C, and an inner passageway 124 which is surrounded by the heat sink 53, the bottom portion 40E and the wall portions 111A, 111C and which passes mainly between the fins 83 are allowed to communicate in series in this order so as to construct the cooling air flow path 110. Then, a portion along the flow path which is located on an opposite side to the battery box 43 is once opened to the inner passageway 124 which is a gap between the mat member 40 and the high-voltage equipment component 41 outwardly of fins 89 of the heat sink 53 so as to communicate with the induction opening 91 of the fan unit 55.

Figure 21:
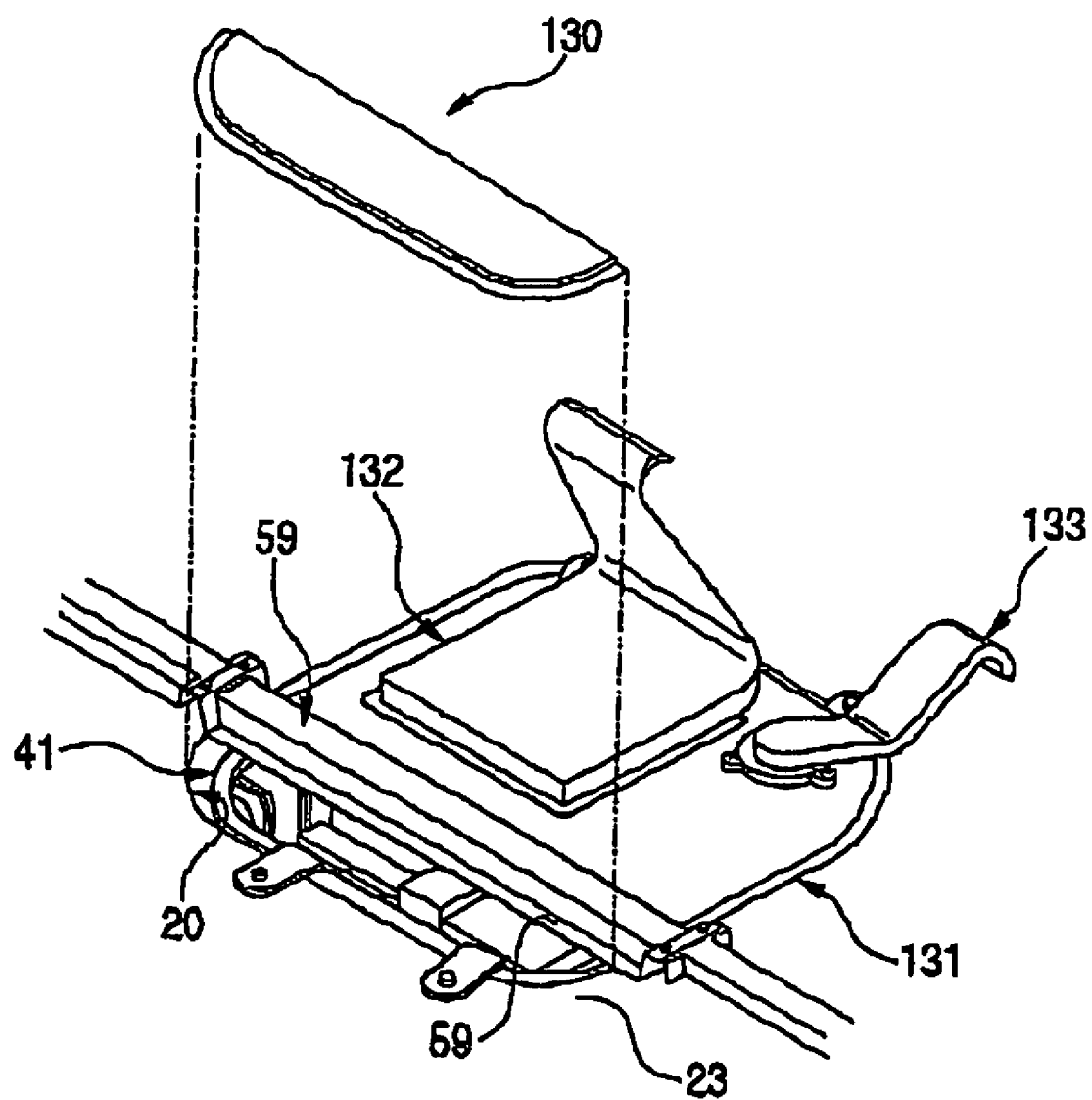
FIG. 21 is a perspective view showing a part of the high-voltage equipment component installing procedure which occurs after the part of the installing procedure shown in FIG. 17.
Figure 22:
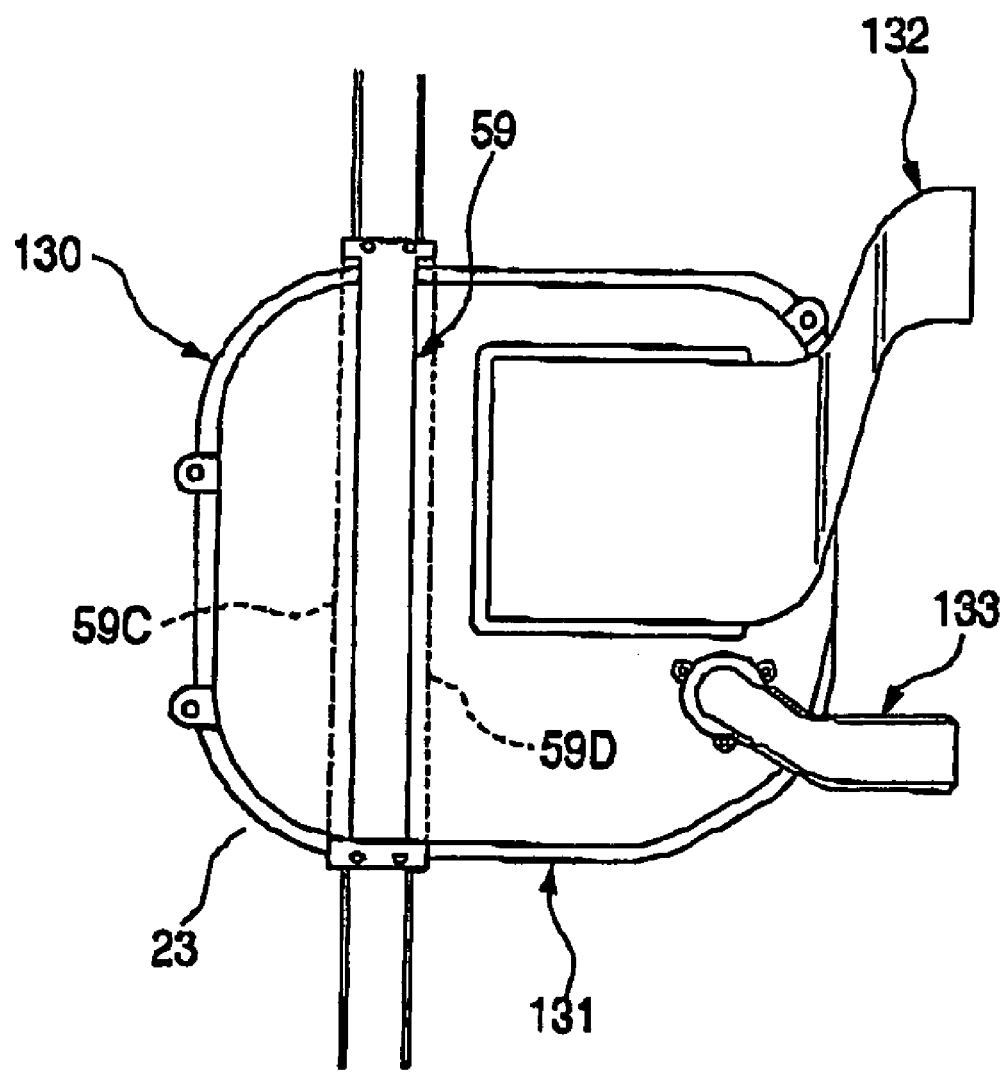
FIG. 22 is a perspective view showing a part of the high-voltage component installing procedure which occurs after the part of the installing procedure shown in FIG. 21.

Here, as shown in FIGS. 21 and 22, an opening portion forward of the cross member separate part 59 of the recessed accommodating portion is closed by a front lid 130 which is supported by the front flange portion 59C or the cross member separate part 59 and the floor panel 23 outwardly of the recessed accommodating portion 20, and an opening portion rearward of the cross member separate part 59 of the recessed accommodating portion 20 is closed by a rear lid 131 which is supported by the rear flange portion 59D of the cross member separate part 59 and the floor panel 23 outwardly of the recessed accommodating portion 20.

Note that an outer induction duct 132 and an outer exhaust duct 133 which extend outwardly farther than the rear lid 131 are mounted on the rear lid 131 with respective joint portions being sealed airtight so as to prevent any leakage of air therefrom, and distal ends of the outer induction duct 132 and the outer exhaust duct 133 are both made to open towards the interior of a passenger compartment. Then, the outer induction duct 132 is, as shown in FIG. 4, joined to the lid 71 of the battery box 43 in such a manner as to surround the whole of the plurality of openings 70 of the battery box 43, and the outer exhaust duct 133 is made to communicate with the exhaust duct 93 of the fan unit 55 as shown in FIG. 6. Note that a joint portion between the lid 71 and the outer induction duct 132 is sealed so as to prevent any leakage of air therefrom, and a joint portion between the outer exhaust duct 133 and the exhaust duct 93 is also sealed so as to prevent any leakage of air therefrom. Furthermore, joint portions of the front lid 130 and the rear lid 131 with the vehicle body floor 10 are also sealed so as to prevent any leakage of air therefrom.

As a result, when an air flow is generated which flows from the induction opening 91 via the exhaust opening 92 by way of the rotation of the fan 55A, cooling air is generated which flows from the interior of the passenger compartment, the outer induction duct 132, the inner flow path 115 in the battery box 43, the inner flow 116 below the battery box 43, the inner flow path 117 between the battery box 43 and the heat sink 45, the inner flow path 118 which passes between the fins 83 of the heat sink 45, the inner flow path 119 between the heat sink 45 and the wall portion 111D, the inner flow path 120 in the floor forming groove 113, the inner flow path 121 between the heat sink 50 and the wall portion 111D, the inner passageway 122 which passes between the fins 86 of the heat sink 50, the inner flow path 123 between the heat sink 50 and the heat sink 53, the inner passageway 124 which passes between the fins 89 of the heat sink 53, an inner flow path 125 which makes the inner passage way 124 to communicate with the fan unit 55, the fan unit 55, and the outer exhaust duct 133 back to the interior of the passenger compartment. Then, when passing through the interior of the battery box 43, the cooling air cools the respective cylindrical cells 74, when passing through the heat sink 45, the cooling air cools the power drive unit 44, when passing through the heat sink 50, the cooling air cools the DC-DC converter 47, and when passing through the heat sink 53, the cooling air cools the air conditioner inverter 52. Note that there is provided no duct which connects the inner flow path 125 with the fan unit 55.

According to the embodiment that has been described heretofore, since the high-voltage equipment component 41 is accommodated in the recessed accommodating portion 20 on the vehicle body floor 10 which is recessed downwardly in the suspended state, the mounting and dismounting work can be performed from above relative to the vehicle body floor 10. Moreover, the high-voltage equipment component 41 can be installed on the vehicle side at one time. Consequently, the working efficiency of the mounting and dismounting work can be increased. In addition, since no load is applied to the recessed accommodating portion 20, the recessed accommodating portion 20 can be made light in weight.

In addition, since the high-voltage equipment component 41 has the sub-assembly frame 58, the rigidity of the high-voltage equipment component 41 can be increased by the sub-assembly frame 58. Consequently, the generation of distortion and deviation that would otherwise occur in the high-voltage equipment component 41 can be prevented, and the reliability of the high-voltage equipment component 41 can be increased.

Furthermore, since the high-voltage equipment component 41 is suspended, the gap can be formed between the recessed accommodating portion 20 and the high-voltage equipment component 41. Consequently, even if there is caused a deformation in the recessed accommodating portion 20, the deformation so caused can be absorbed by the gap, thereby making it possible to prevent the high-voltage equipment component 41 from being affected by the deformation.

Additionally, since the sub-assembly frame 58 is connected to the cross members 26, 28, 66 of the vehicle body floor 10, the rigidity of the sub-assembly frame 58 when connected or the rigidity of the high-voltage equipment component 41 can be increased more effectively. Consequently, the generation of distortion and deviation that would otherwise occur in the high-voltage equipment component 41 can be prevented in an ensured fashion, and the reliability of the high-voltage equipment component 41 can further be increased.

In particular, since the sub-assembly frame 58 is connected to the lower portion of the cross member 66 which is provided to extend across the recessed accommodating portion 20 on the vehicle body floor 10 in the transverse direction, the rigidity of the sub-assembly frame 58, in particular, in the transverse direction can be enhanced. Consequently, the generation of distortion and deviation that would otherwise occur in the high-voltage equipment component 41 can be prevented in an ensured fashion, and the reliability of the high-voltage equipment component 41 can further be increased.

In addition, since the sub-assembly frame 58 is formed into the annular shape which follows the interior of the opening in the recessed accommodating portion 20 on the vehicle body floor 10 and is also formed into the closed cross-sectional shape, the rigidity of the sub-assembly frame 58 or the rigidity of the high-voltage equipment component 41 can be increased more effectively. Consequently, the generation of distortion and deviation that would otherwise occur in the high-voltage equipment component 41 can be prevented in an ensured fashion, and the reliability of the high-voltage equipment component 41 can further be increased.

In addition, since the high-voltage equipment component 41 is disposed forward of the fuel tank 21 and the silencer 22B of the exhaust pipe 22, an effective layout of high-tension wiring can be effected between the battery box 43 and the power drive unit 44, and the high-tension wiring can be made shorter.

Furthermore, since there can be provided a more advantageous situation in terms of avoiding the effect of heat when compared with a case where the power drive unit 44 including a motor inverter is disposed in an engine compartment, more current is allowed to conduct, thereby making it possible to increase the output of the running electric motor. Alternatively, a more inexpensive switching element can be used in order to obtain the same output, and since the number of elements for use can be reduced, the production costs can be reduced.

Furthermore, since the high-voltage equipment component 41 which is heavy is disposed lower than the level of the floor of the first-row seat 11 on the side thereof which faces the second-row seat 12, the load can be applied substantially equally to the vehicle at the front and rear, whereby the load to the suspensions can be reduced, and since the center of gravity of the high-voltage equipment component 41 becomes lower than the level of the floor, the running stability when turning can be increased. Furthermore, since the distance between the ears of occupants and the high-voltage equipment component 41 can be made longer and the mat member 40 has noise insulating properties, the quietness can be increased.

Additionally, since the high-voltage equipment component 41 is disposed on the side of the first-row seat 11 which faces the second-row seat 12, the seat arrangement of the third-row seat 13 can be eased, and the capacity of a luggage compartment can be secured to a satisfactory extent.

Furthermore, while the high-voltage equipment component 41 is disposed lower than the level of the floor, since the recessed accommodating portion 20 is formed as an integral part of the floor panel 23 and the high-voltage equipment component 41 is disposed in the recessed accommodating portion 20, not only can an increase in the number of parts be suppressed but also the ingress of water and mud into the high-voltage equipment component 41 can be prevented in an ensured fashion.

In addition, since the mat member 40 formed of the resilient heat insulating member is disposed in the gap formed between the high-voltage equipment component 41 and the bottom portion 20E of the recessed accommodating portion 20 due to the high-voltage equipment component 41 being suspended and the cooling air flow path 110 for allowing cooling air to flow to the high-voltage equipment component 41 is formed by the mat member 40, the cooling air flow path 110 can be formed relatively easily. Consequently, the cooling air flow path 110 for passing cooling air to the high-voltage equipment component 41 can be formed at low costs. Moreover, the cooling flow path 110 is installed at one location as part of the high-voltage equipment component 41, cooling can be implemented effectively by the single fan unit 55.

Furthermore, since the mat member 40 formed of the resilient heat insulating member is disposed in the gap formed between the high-voltage equipment component 41 and the bottom portion 20E of the recessed accommodating portion 20 due to the high-voltage equipment component 41 being suspended, even if some force is applied to the vehicle body floor 10 to thereby deform the same floor, the deformation can be absorbed by the resilient deformation of the mat member 40. Consequently, the high-voltage equipment component can be protected through the cushioning action of the mat member 40.

In addition, since the mat member 40 is pressed to thereby be compressed and deformed by an installing pressure exerted thereon by the high-voltage equipment component 41 when it is arranged in the recessed accommodating portion 20, the gap formed between the mat member 40 and the high-voltage equipment component 41 in the cooling air flow path 110 formed by the mat member 40 can be sealed so as to prevent any leakage of cooling air from the gap. Consequently, the cooling efficiency can be increased.

In addition, the mounting error of the high-voltage equipment component can be absorbed by the deformation of the mat member 40. Consequently, since a certain mounting error can be permitted, the mounting work of the high-voltage equipment component 41 can be eased, and moreover, the production yield can be increased.

Furthermore, since the mat member 40 is constructed to be pressed so as to be compressed and deformed by the fixing bracket 57 for connecting together respective pieces of high-voltage equipment of the high-voltage equipment component 41, only the shape of the fixing bracket 58 may be taken into consideration for the sealed portion of the mat member 40 which compresses and deforms at the time of constructing the cooling air flow path 110. Consequently, the design of the mat member 40 can be facilitated.

In addition, since the temperature of the battery box 43 is relatively low whereas the temperature or the DC-DC converter 47 and the air conditioner inverter 52 are relatively high, as has been described above, in the event that the battery box 43 is cooled earlier than the DC-DC converter 47 and the air conditioner inverter 52, these pieces of high-voltage equipment can all be cooled efficiently.

While exhaust air discharged from the radiator fan while the vehicle is running using the driving force of the internal combustion engine and exhaust air discharged from a condenser fan while the air conditioner is in operation is high in temperature, and the exhaust air is discharged from the engine compartment to the underside of the floor, the mat member 40 formed of the heat insulating material can prevent the conduction of the heat of the exhaust air to the high-voltage equipment component 41.

As has been described in detail heretofore, according to the first aspect of the invention, since the high-voltage equipment component is arranged in the downwardly recessed accommodating portion formed on the vehicle body in the suspended state, mounting and dismounting work can be performed from above relative to the vehicle body floor.

According to the second aspect of the invention, since the high-voltage equipment component is accommodated in the recessed accommodating portion on the vehicle body floor which is recessed downwardly in the suspended state via the sub-assembly frame which is supported on the vehicle body floor, the mounting and dismounting work can be performed from above relative to the vehicle body floor. Consequently, the working efficiency of the mounting and dismounting work can be increased. In addition, since the high-voltage equipment component has the sub-assembly frame, the rigidity of the high-voltage equipment component can be increased by the sub-assembly frame. Consequently, the generation of distortion and deviation that would otherwise occur in the high-voltage equipment component can be prevented, and the reliability of the high-voltage equipment component can be increased.

Furthermore, since the high-voltage equipment component is suspended, the gap can be formed between the recessed accommodating portion and the high-voltage equipment component. Consequently, even if there is caused a deformation in the recessed accommodating portion, the deformation so caused can be absorbed by the gap, thereby making it possible to prevent the high-voltage equipment component from being affected by the deformation.

According to the third aspect of the invention, since the sub-assembly frame is connected to the reinforcement members of the vehicle body floor, the rigidity of the sub-assembly frame or the rigidity of the high-voltage equipment component can be increased more effectively. Consequently, the generation of distortion and deviation that would otherwise occur in the high-voltage equipment component can be prevented in an ensured fashion, and the reliability or the high-voltage equipment component can further be increased.

According to the fourth aspect of the intention, since the sub-assembly frame is connected to the lower portion of the cross member which is provided to extend across the recessed accommodating portion on the vehicle body floor in the transverse direction, the rigidity of the sub-assembly frame, in particular, in the transverse direction can be enhanced. Consequently, the generation of distortion and deviation that would otherwise occur in the high-voltage equipment component can be prevented in an ensured fashion, and the reliability of the high-voltage equipment component can further be increased.

According to the fifth aspect of the invention, since the sub-assembly frame is formed into the annular shape which follows the interior of the opening in the recessed accommodating portion on the vehicle body floor and is also formed into the closed cross-sectional shape, the rigidity of the sub-assembly frame or the rigidity of the high-voltage equipment component can be increased more effectively. Consequently, the generation of distortion and deviation that would otherwise occur in the high-voltage equipment component can be prevented in an ensured fashion, and the reliability of the high-voltage equipment component 41 further be increased.

According to the sixth aspect of the invention, since the high-voltage equipment component is arranged in the downwardly recessed accommodating portion formed on the vehicle body floor in the suspended state, the mounting and dismounting work can be performed from above relative to the vehicle body floor. Consequently, the working efficiency of the mounting and dismounting work can be increased. In addition, since the heat insulating member is disposed in the gap formed between the high-voltage equipment component and the bottom portion of the recessed accommodating portion due to the high-voltage equipment component 41 being suspended and the cooling air flow path for allowing cooling air to flow to the high-voltage equipment component is formed by the mat member, the cooling air flow path can be formed relatively easily. Consequently, the cooling air flow path for passing cooling air to the high-voltage equipment component can be formed at low costs. Furthermore, since the heat insulating member is disposed in the gap formed between the high-voltage equipment component and the bottom portion of the recessed accommodating portion due to the high-voltage equipment component being suspended, even if some force is applied to the vehicle body floor to thereby deform the same floor, the deformation can be absorbed by the resilient deformation of the heat insulating member. Consequently, the high-voltage equipment component can be protected through the cushioning action of the heat insulating member.

According to the seventh aspect of the invention, sine the heat insulating member is pressed to thereby be compressed and deformed by the high-voltage equipment component when it is arranged in the recessed accommodating portion, the gap formed between the heat insulating member and the high-voltage equipment component in the cooling air flow path formed by the heat insulating member can be sealed so as to prevent any leakage of cooling air from the gap. Consequently, the cooling efficiency can be increased. In addition, the mounting error of the high-voltage equipment component can be absorbed by the deformation of the heat insulating member. Consequently, since the certain mounting error can be permitted, the mounting work of the high-voltage equipment component can be eased, and moreover, the production yield can be increased.

According to the eighth aspect of the invention, since the heat insulating member is constructed to be pressed so as to be compressed and deformed by the fixing bracket for connecting together respective pieces of high-voltage equipment of the high-voltage equipment component, only the shape of the fixing bracket may be taken into consideration for the sealed portion of the mat member which compresses and deforms at the time of constructing the cooling air flow path. Consequently, the design of the heat insulating member can be facilitated.

What is claimed is:

1. A structure for installing a high-voltage electrical equipment component to a vehicle, wherein
the high-voltage electrical equipment component is arranged in a downwardly recessed accommodating portion formed on a vehicle body floor in a suspended state,
the high-voltage electrical equipment component is in a suspended state, attached to and suspended from a frame assembly, and
the frame assembly comprises a cross member separate part connected to an annular sub-assembly frame, wherein
the cross member separate part is provided transversely across an annular portion of the annular sub-assembly frame, and
the cross member separate part is connected to left and right cross member separate portions to form a liner cross member.

2. The structure according to claim 1, wherein the sub-assembly frame is connected to a reinforcement member of the vehicle body floor which is provided on an upper or lower surface of the vehicle body floor.

3. The structure according to claim 1, wherein a heat insulating member for forming a flow path for allowing cooling air to flow towards the high-voltage equipment component is interposed between the high-voltage equipment component and a bottom portion of the recessed accommodating portion.

4. The structure according to claim 3, wherein the beat insulating member is formed of a resilient material and is pressed to be compressed and deformed by the high-voltage equipment component when the high-voltage equipment component is arranged in the recessed accommodating portion.

5. The structure according to claim 4, wherein the heat insulating member is pressed to be compressed and deformed by a connecting member which connects respective pieces of high-voltage equipment of the high-voltage equipment component together.

6. The structure according to claim 1, wherein the sub-assembly frame follows an interior side of an opening in the accommodating recessed portion.

* * * * *